United States Patent
Zander

(10) Patent No.: US 10,641,350 B2
(45) Date of Patent: May 5, 2020

(54) ROTATIONAL FRICTION BRAKE REGULATED BY ANGULAR ACCELERATION

(71) Applicant: BRILLIANZE SWEDEN AB, Ystad (SE)

(72) Inventor: Sten-Thore Zander, Trelleborg (SE)

(73) Assignee: BRILLIANZE SWEDEN AB, Ystad (SE)

( * ) Notice: Subject to any disclaimer, the term of this patent is extended or adjusted under 35 U.S.C. 154(b) by 0 days.

(21) Appl. No.: 15/998,890

(22) PCT Filed: Feb. 15, 2017

(86) PCT No.: PCT/EP2017/053416
§ 371 (c)(1),
(2) Date: Aug. 16, 2018

(87) PCT Pub. No.: WO2017/140734
PCT Pub. Date: Aug. 24, 2017

(65) Prior Publication Data
US 2019/0338814 A1  Nov. 7, 2019

(30) Foreign Application Priority Data
Feb. 16, 2016 (SE) ...................................... 1650201

(51) Int. Cl.
*F16D 59/00* (2006.01)
*A01K 89/0155* (2006.01)
(Continued)

(52) U.S. Cl.
CPC ........ *F16D 59/00* (2013.01); *A01K 89/01557* (2015.05); *B65H 75/4442* (2013.01);
(Continued)

(58) Field of Classification Search
CPC ................................................. A01K 89/01557
(Continued)

(56) References Cited

U.S. PATENT DOCUMENTS

| 1,444,560 | A | * | 2/1923 | Schmid | ............... | A01K 89/0155 |
|---|---|---|---|---|---|---|
| | | | | | | 242/257 |
| 2,055,358 | A | * | 9/1936 | Maynes | ............. | A01K 89/0155 |
| | | | | | | 242/289 |

(Continued)

FOREIGN PATENT DOCUMENTS

| GB | 809014 A | * | 2/1959 | ......... | A01K 89/0155 |
|---|---|---|---|---|---|
| SE | 506580 C2 | | 1/1998 | | |

OTHER PUBLICATIONS

International Search Report, PCT/EP2017/053416, dated May 26, 2017, 2 pgs.

*Primary Examiner* — Emmanuel M Marcelo
(74) *Attorney, Agent, or Firm* — Volpe and Koenig, P.C.

(57) ABSTRACT

A rotational friction brake regulated by the rate of change of angular speed is disclosed. The rotational friction brake includes: a first body, a second body rotationally attached to said first body, the second body rotating around a rotational center axis of said second body, and at least one braking arm rotationally attached to said second body in a pivot point. The pivot point is eccentrically offset to said rotational center axis. The at least one braking arm comprises a braking member arranged to frictionally engage a part of said first body. The at least one braking arm has a mass center placed at a distance from said pivot point that is longer than a distance from said pivot point to said rotational center axis. The braking member is arranged to frictionally engage said part of said first body. A fishing reel comprising a rotational friction brake is also disclosed.

16 Claims, 9 Drawing Sheets

(51) Int. Cl.
  *B65H 75/44* (2006.01)
  *F16D 51/16* (2006.01)
  *F16D 51/20* (2006.01)
  *F16D 125/28* (2012.01)
  *F16D 127/00* (2012.01)
  *F16D 127/06* (2012.01)

(52) U.S. Cl.
  CPC .............. *F16D 51/16* (2013.01); *F16D 51/20* (2013.01); *F16D 2125/28* (2013.01); *F16D 2127/002* (2013.01); *F16D 2127/06* (2013.01)

(58) Field of Classification Search
  USPC ..................................................... 188/181 A
  See application file for complete search history.

(56) References Cited

U.S. PATENT DOCUMENTS

| | | | | |
|---|---|---|---|---|
| 2,158,597 A | * | 5/1939 | Watson | A01K 89/0155 242/289 |
| 2,290,662 A | * | 7/1942 | Willison | A01K 89/0155 242/289 |
| 2,587,652 A | * | 3/1952 | Rostine | B67D 7/40 242/375 |
| 2,896,912 A | * | 7/1959 | Faugier | A62B 35/0093 242/381.6 |
| 2,967,676 A | * | 1/1961 | Klingberg | A01K 89/01557 242/289 |
| 3,477,659 A | | 11/1969 | Morritt | |
| 3,587,474 A | * | 6/1971 | Fuchs | B61B 11/004 104/173.2 |
| 4,196,871 A | * | 4/1980 | Kobayashi | A01K 89/0155 242/287 |
| 4,390,140 A | * | 6/1983 | Karlsson | A01K 89/0155 242/289 |
| 5,542,619 A | * | 8/1996 | Karlsson | A01K 89/0155 242/289 |
| 5,865,387 A | * | 2/1999 | Hirano | A01K 89/01557 242/289 |
| 5,934,588 A | | 8/1999 | Ylikangas | |
| 5,996,921 A | * | 12/1999 | Hogaki | A01K 89/0155 182/239 |
| 6,076,640 A | * | 6/2000 | Carlson | A01K 89/016 188/82.1 |
| 6,126,105 A | * | 10/2000 | Yamaguchi | A01K 89/0155 242/288 |
| 6,254,021 B1 | * | 7/2001 | Morimoto | A01K 89/01557 242/289 |
| 6,474,580 B1 | * | 11/2002 | Hirayama | A01K 89/0155 242/289 |
| 6,957,787 B1 | | 10/2005 | Rho | |
| 9,253,969 B2 | * | 2/2016 | Niitsuma | A01K 89/0155 |
| 9,433,197 B2 | * | 9/2016 | Hyun | A01K 89/01555 |
| 2012/0248233 A1 | * | 10/2012 | Saito | A01K 89/0155 242/289 |
| 2013/0181081 A1 | * | 7/2013 | Niitsuma | A01K 89/033 242/289 |

* cited by examiner

ROTATIONAL FRICTION BRAKE REGULATED BY ANGULAR ACCELERATION

TECHNICAL FIELD

The present disclosure relates to a rotational friction brake for braking a rotating body, and more particularly to a rotational friction brake wherein the braking power is regulated by the angular acceleration of the rotating body. The present disclosure further relates to a fishing reel comprising such a rotational friction brake.

BACKGROUND ART

Rotational friction brakes are well known in the art. Examples of such brakes are disc brakes, drum brakes etc. They all have in common that they in one way or another subject a rotating body to pressure from one or more braking members on one of the surfaces of the rotating member, these surfaces being for example inside an enveloped surface of the rotating body, outside an enveloped surface of the rotating body, or on a plane side of the rotating body.

Most rotating friction brakes are operated by a system not in itself part of the rotating body, such as for example the braking system of a car or train. The braking power in these kinds of rotational friction brakes will thus not be regulated by the movement on the rotating body itself. There are also automatic rotational friction brakes, for which the braking power is dependent on the behavior of the rotating member. Examples of such brakes are centrifugal brakes. These typically consist of a plurality of braking arms connected to the rotating body such that said plurality of braking arms may be moved with respect to the rotating body along an axis that enables the center of gravity of the braking arm to move radially outwards as the angular speed of the rotating member increase. The braking power of these kinds of brakes thus depend on the angular speed of the rotating member.

In some applications, it may be beneficial to regulate a braking action based on the rate of change of the angular speed. Dependent on the situation, the braking action may occur for a positive rate of change of the angular speed, i.e. a (positive) angular acceleration, or a negative rate of change of the angular speed, i.e. a negative angular acceleration also referred to as an angular deceleration. There are several potential benefits of such a brake. An advantage is that it may be used for applications where high angular speeds are required. In such applications, centrifugal brakes are less suitable as they may considerably limit the rotational speeds.

A typical example of applications where this is a problem is systems such as e.g. cable drums, water hoses, large paper rolls and sewing thread rolls. These systems typically comprise a product (e.g. a cable, a hose, paper or thread) which is winded onto a spool at a plurality of revolutions.

An application where a positive rate of change of the angular speed may be used to actuate the brake is in the trolley system on elevators. In case of a malfunction wherein the elevator starts to accelerate downwards too fast, an angular brake actuated by positive angular acceleration may be allowed to activate thus reducing, or even stopping, the downward motion of the elevator already before a dangerous speed is reached.

An application where a negative rate of change of the angular speed may be used to actuate the brake is for fishing reels. The application is a typical example of a system where there is a need to promptly release a large quantity of a product from a spool, and that results in a considerable positive angular acceleration of the spool as the product is pulled from it. The phase of positive angular acceleration of the spool will end as soon as the pulling force on the product is zero. Unfortunately, the inertia of the spool will act to continue the unwinding, resulting in considerable risk of the product still contained on the spool to become entangled in itself, in the spool and in other mechanical parts in its vicinity.

A fishing reel comprises a frame and a line spool rotatably mounted in the frame. To prevent the spool during casting, from rotating at such a high speed that the line cannot be paid out at the same rate but instead rises forming a so-called birds nest (also called backlash), fishing reels are often equipped with a rotational braking system, usually comprising a combination of rotational brakes of different kinds, such as for example one or more friction brakes (e.g. centrifugal brakes, spool tension brakes etc.) and a magnetic brake. During a cast, the rotational speed of the line spool increases rapidly to maximum speed during a relatively short, initial phase of positive angular acceleration, to thereafter decrease during a longer phase of negative angular acceleration (deceleration).

Most rotational friction brakes of prior art, such as e.g. centrifugal brakes and magnetic brakes, are immediately actuated during a cast and thus produces a braking action commencing during the phase of positive angular acceleration. During this phase, there is however only a negligible risk of line rise, since it is the line, or more precisely the lure attached to it, that "pulls" the line spool, for which reason the line spool need not be subjected to braking during this phase. Braking the line spool during the phase of positive angular acceleration reduces the possibilities of making long casts. When the lure and the line are no longer "pulling" the line spool, i.e. during the phase of negative angular acceleration, it is however necessary to brake the line spool to prevent line rise.

Swedish patent SE506580 (granted 1998 Jan. 12 to Abu A B) discloses a brake system for fishing reels that aims to brake only during the phase of negative angular acceleration of the reel. This is achieved by using a plurality of braking arms where each arm is arranged to be in a non-braking position during a positive angular acceleration of the spool, and wherein each braking arm is arranged to flip over to a braking position during negative angular acceleration of the spool.

A particular problem with the invention disclosed in SE506580 is that the braking arms are positioned in a non-activated position during the whole phase of positive acceleration of the spool, and as the spool has reached its maximum speed, the braking arms flip into their activated position abruptly, initiating a quite significant braking of the drum as the braking power has a positive dependence on the spool angular velocity. Hence the braking action will not be smooth in the transition between a positive and a negative angular acceleration phase of the spool resulting in a reduced cast length and an undesired user experience.

Examples of such centrifugal brakes will now be provided for a clearer appreciation of the background art.

U.S. Pat. No. 3,587,474 A discloses a dragline winch for ski tows and the like, the dragline winch comprising a rotational friction brake having two brakeshoes 8 pivotally attached to a rotating body. The rotational friction brake of U.S. Pat. No. 3,587,474 A is actuated by the rotational speed of the rotating body through centrifugal forces.

U.S. Pat. No. 2,587,652 A discloses a braking mechanism for hose reeling apparatus. The braking mechanism comprises a pair of substantially semi-circular weights or brake elements pivotally mounted on an inner rotating drum. The braking mechanism is disclosed as a centrifugal braking mechanism which is thus actuated by the rotational speed of the rotating body through centrifugal forces.

U.S. Pat. No. 2,055,358 discloses a fishing reel comprising a rotational friction brake having a plurality of brake members disposed and provided with pivotal connections intermediate their ends upon the rotatable wall of the shield. The rotational friction brake of U.S. Pat. No. 2,055,358 is centrifugally operated, i.e. actuated by the rotational speed of the rotating body through centrifugal forces.

U.S. Pat. No. 6,076,640 discloses fishing reel comprising a rotational friction brake having a pair of brake levers which are biased in a braked position using bias springs. The brake levers are pivotally connected to a lever base arranged to rotate with the spool. One portion of the brake levers, the counter weight arm, is equipped with a counter weight whereas another portion of the brake levers, the braking lever, is arranged to frictionally engage a non-rotating outer body, a brake drum. The rotational friction brake of U.S. Pat. No. 6,076,640 is centrifugally operated, i.e. actuated by the rotational speed of the rotating body through centrifugal forces.

U.S. Pat. No. 3,477,659 A discloses a rotatable spool fishing reel comprising a friction brake acting between the casing and the spool wherein the friction brake comprises one or more brake shoes arranged to frictionally engage the casing. The rotational friction brake of U.S. Pat. No. 3,477,659 A is urged into engagement by the effect of a centrifugal force, i.e. actuated by the rotational speed of the rotating body through centrifugal forces.

SUMMARY

It is an object of the present disclosure to mitigate, alleviate or eliminate one or more of the above-identified deficiencies in the art and disadvantages singly or in any combination and solve at least the above mentioned problem. A further object is to provide a rotational friction brake for a rotating body, said rotational friction brake being regulated by the angular acceleration of said rotating body.

By angular acceleration of a rotating body, is meant the rate of change of the angular speed of said rotating body, said rate of change being either positive or negative. It is thus understood that a negative rate of change of the angular speed, often referred to as an angular deceleration, or a negative angular acceleration, is also to be covered by the term angular acceleration.

According to a first aspect, these and other objects are achieved in full, or at least in part, by a rotational friction brake regulated by the rate of change of the angular speed, comprising: a first body, a second body rotationally attached to the first body, the second body being arranged to rotate around a rotational center axis of the second body, at least one braking arm rotationally attached to the second body in a pivot point, wherein the pivot point is eccentrically offset to the rotational center axis along a radial axis, each of the at least one braking arm comprises a braking member arranged to frictionally engage a part of the first body, the at least one braking arm having a mass center placed along a braking arm axis, the braking arm axis intersecting the pivot point, forming an angle $\alpha$ to a normal axis, the normal axis being defined perpendicular to the radial axis through the pivot point, wherein the mass center is placed at a distance from the pivot point that is longer than a distance from the pivot point to the rotational center axis, wherein the braking member is arranged to frictionally engage the part of the first body for values of $\alpha$ larger than a first angle $\alpha 1$ and/or smaller than a second angle $\alpha 2$, wherein the first angle $\alpha 1$ is larger than the second angle $\alpha 2$.

A key feature of this design is that the pivot point and the mass center of the at least one braking arm are located at a distance from each other which exceeds the distance between the pivot point and the rotational center axis. Discussing the example of a positive angular acceleration, the effect of this feature is that the at least one braking arm, during a positive angular acceleration of the second body, will be experiencing a moment at the pivot point, which can force the at least one braking arm to make contact with the at least one stop member. Another effect of the key feature is that the net centrifugal force acting on the mass center of the at least one braking arm will have a composant directed away from the pivot point, thus helping to balance the relative position of the at least one braking arm with respect to the rotating member during the transition from a positive angular acceleration to a negative angular acceleration of the rotating second body. If the at least one braking arm with the key feature of this disclosure is arranged to be able to come in physical contact with a part of the first body, a rotational friction brake may be realized, the rotational friction brake being in an inactive state during at least part of a positive angular acceleration phase of the second rotating body, being in an active state during at least part of a negative angular acceleration phase of the second body, and gradually introducing braking action in the transition between the inactive and active states. The key feature may thus provide a smooth movement of the at least one braking arm, in contrast to the movement of a typical braking arm in the prior art, such as for example the type of braking arm disclosed in SE506580, where the one or more braking arms have the mass center positioned at a distance from the pivot point which is smaller than the distance between the pivot point and the rotational center axis.

It is to be understood that, although the example discussed hereinabove referred to a brake actuated by a negative angular acceleration, the key features are equally valid for a rotational friction brake arranged to be actuated by a positive angular acceleration. Actually, an embodiment of a rotational friction brake arranged to be actuated by a negative angular acceleration when rotating in a first rotational direction will be actuated by a positive angular acceleration if the second body is rotated in a second rotational direction, opposed to the first rotational direction. This implies that the same brake that is intended for an application requiring actuation of the brake at negative angular acceleration may also be used for another application requiring actuation of the brake at positive angular acceleration. This may be realized by, for example, mounting the brake on an opposite side of the rotating second body, thus reversing the way it is actuated.

Furthermore, it is understood that there may be more than one braking arm in the rotational friction brake. Thus there may be more than one braking member and more than one pivot point. Typically, each braking arm is connected to the second body in its own respective pivot point. However, more than one braking arm may be connected to the second body in the same pivot point. Likewise, a braking arm may have one braking member only. Alternatively, a braking arm may have more than one braking member.

According to some embodiments, the rotational friction brake further comprises at least one stop member wherein each of the at least one stop member is arranged to limit the movement of each of the at least one braking arm such that the angle α is limited to a maximum angle smaller than the first angle α1 or a minimum angle larger than the second angle α2 thus limiting movement of the at least one braking arm relative to the second body. The at least one stop member allows for designing the rotational friction brake for being actuated either by a positive or by a negative angular acceleration of the second body for a specific reference rotational direction of the second body. This may be advantageous as it allows designing the brake for a specific purpose.

It is important to stress that the at least one stop member is not necessary for all embodiments of the rotational friction brake. A rotational friction brake may be designed such as to allow actuating the brake for a positive as well as a negative angular acceleration. Such a brake may be useful for example for a line spool for which the maximum positive acceleration should be limited while still allowing for a braking to be actuated during the negative acceleration of the line spool to avoid forming a bird nest. It is understood that the disclosed rotational friction brake is not limited to embodiments where the braking power is actuated by the same absolute value of the angular acceleration on both a positive and negative acceleration. It may be beneficial for some embodiments to allow a stronger braking power for a positive angular acceleration than for a negative angular acceleration or vice versa.

Thus it has been disclosed a rotational friction brake regulated by the rate of change of the angular speed. The rotational friction brake comprises a first body and a second body rotationally attached to the first body, wherein the second body is arranged to rotate around a rotational center axis of the second body. The rotational friction brake further comprises at least one braking arm rotationally attached to the second body in a pivot point. The pivot point is eccentrically offset to the rotational center axis along a radial axis. The at least one braking arm comprises a braking member arranged to frictionally engage a part of the first body. The at least one braking arm has a mass center placed along a braking arm axis, which intersects the pivot point forming an angle α to a normal axis. The normal axis is defined perpendicular to the radial axis through the pivot point. The mass center is placed at a distance from the pivot point that is longer than a distance from the pivot point to the rotational center axis. The braking member is arranged to frictionally engage the part of the first body for values of α larger than a first angle α1. The rotational friction brake further comprises at least one stop member arranged to prevent α becoming smaller than a second angle α2, thus limiting movement of the at least one braking arm relative to the second body.

According to some embodiments, the braking member is elastic, or provides resilience, allowing the braking arm axis to assume an angle α larger than the first angle α1 and/or smaller than the second angle α2. This implies that the rotational friction brake may allow for gradually increasing the friction, and hence the braking power, with an increase of the angle α for a case where the angle α exceeds the first angle α1, or by a decrease of the first angle α for a case where the angle α falls below the second angle α2.

The advantage of these embodiments is that it adds further control to the movement of the at least one braking arm with respect to the rotating second body, and hence also adds further control over the braking action. The further control of the movement of the at least one braking arm is a result from the frictional forces giving rise to a moment, around the pivot point in the reference system of the rotating second body, of the at least one braking arm which is directed either opposite to or in the same direction as the moment of the at least one braking arm arising from the centrifugal forces. The moment occurring due to the friction will thus strive to either decrease or increase the braking action. In the case of a decrease in braking action, a decrease in the moment will occur, thus allowing for the system to be made self-balancing. The design using a flexible material facilitates utilization of this balance in a range of angles α larger than the first angle α1, or alternatively or additionally in a range of angles α smaller than the second angle α2. By carefully choosing the elastic/resilient properties of the braking member, the braking power as function of a may be tailored.

According to some embodiments, the at least one braking arm comprises a flexible material such that the at least one braking arm is allowed to bend such that the angle α exceeds the first angle α1, or the angle α falls below the second angle α2.

According to some embodiments, the first body is a drum and the braking member is arranged to frictionally engage an inner portion of a peripheral wall of the drum.

According to some embodiments, the shape of a part of the braking member is such that a distance between the pivot point and an outer periphery of the braking member increases with an increase in an angle γ, the distance being defined along a distance axis taking the angle γ with respect to the radial axis, wherein the shape of the part of the braking member allows for a gradual increase of the area of contact between the braking member and the part of the first body when the braking member is being compressed.

This shape may be advantageous as it enables the area of contact between the braking member and the part of the first body to increase for an increasing compression of the braking member, hence affecting the braking action. By carefully choosing the shape of the braking member, the braking power as function of a may be tailored.

A braking member may be shaped in different ways. For example, a braking member may be shaped such as to make contact with the first body at a position close to the pivot point whereby the area of contact, with increasing compression, increases outwardly such that the area of contact covers areas further away from the pivot point. Alternatively, a braking member may be shaped such as to make contact with the first body at a position at a distance from the pivot point whereby the area of contact, with increasing compression, increases inwardly such that the area of contact covers areas closer to the pivot point.

According to some embodiments, the braking member comprises two or more portions wherein each of the two or more portions have its own set of material properties. The two or more portions may comprise different materials with different material properties. A portion may, alternatively, comprise several materials, for example in a stacked configuration. The use of two or more portions may be an advantage as it further increases the degrees of freedom in tailoring the braking power as function of the position of the braking arm as the braking member is compressed.

It is understood that the angle γ may be defined either in a counter-clockwise direction or in a clockwise direction dependent on the location of a braking member in relation to the pivot point. Furthermore, it is understood that there may be more than one braking member on a braking arm. For example, expressed in terms of angular positions along a reference direction, there may be one braking member located such that it engages a part of the first body at an angular position located after the angular position of the pivot point and a further braking member located such that it engages a further part of the first body at an angular position located before the angular position of the pivot point.

According to some embodiments, the shape of a part of the braking member is such that, when the angle $\alpha<\alpha 1$, the distance between the pivot point and the outer periphery of the braking member increases with an increase in an angle $\gamma$. The distance is here defined along a distance axis taking the angle $\gamma$ with respect to the radial axis. The shape of the part of the braking member, for the range $\alpha>\alpha 1$, allows for a gradual increase of the area of contact between the braking member and the part of the first body as function of an increase of the angle $\alpha$ when the braking member is being compressed.

According to some embodiments, the mass center of the at least one braking arm is located on one side of a plane. The plane is orthogonal to the radial axis and intersects the rotational center axis. The mass center of the at least one braking arm is located on the side of the plane not containing the pivot point.

This is advantageous as it allows for keeping the at least one braking arm at positions with respect to the second body where the centrifugal forces acting on the at least one braking arm is not allowed to be too dominant.

According to some embodiments, the mass center of the at least one braking arm is located within a cylindrical volume. The cylindrical volume is coaxial with the rotational center axis and has a circular cross sectional area orthogonal to the rotational center axis. Moreover, the radius of the circular cross sectional area is equal to the distance between the rotational center axis and the pivot point.

This is advantageous as it allows for keeping the at least one braking arm at positions with respect to the second body where the centrifugal forces acting on the at least one braking arm is not allowed to be too dominant.

According to some embodiments, the at least one braking arm comprises a portion made of a material with higher density than the average density of the at least one braking arm. This allows for the mass center of the at least one braking arm to be positioned within, or close to, the portion of the at least one braking arm.

According to some embodiments, the rotational friction brake further comprises at least one preventing member arranged to be adjustable, allowing for the angle $\alpha$ to be limited to a maximum angle smaller than the angle $\alpha 1$ or a minimum angle larger than the angle $\alpha 2$, such that each of the at least one preventing member prevents each of the braking member from frictionally engaging the first body. The preventing member may be advantageous as it allows for manually disabling the rotational friction brake. This may be beneficial for example, when rotating the second body in a rotational direction opposed to the reference direction.

It is to be understood that the at least one stop member and the at least one preventing member may be associated with similar technical effects, i.e. to limit the at least one braking arm to a range of angles $\alpha$ within which the at least one braking arm is prevented from making contact with the first body, thus disabling braking action altogether.

For some embodiments, the at least one stop member are fixed and typically determine if the brake is actuated by positive angular acceleration or negative angular acceleration when operated such that the second body rotates in the reference direction. For such embodiments, the at least one preventing member are typically movable and used to manually disable the brake. However, in alternative embodiments, also the at least one stop member may be adjustable. Such embodiments may allow for reconfiguring the rotational friction brake between being actuated by a positive angular acceleration and a negative angular acceleration for a specific rotational direction of the second body. This implies that the at least one stop member, after a reconfiguration of the brake, may instead act as the at least one preventing member and vice versa.

According to some embodiments, the position of the portion with respect to the at least one braking arm is adjustable, allowing changing the position of the mass center with respect to the at least one braking arm.

According to some embodiments, the second body comprises two braking arms, wherein a first of the two braking arms is rotationally attached to the second body in the pivot point and wherein a second of the two braking arms is rotationally attached to the second body in a second pivot point. The pivot point and the second pivot point are located along the radial axis on either side of the rotational center axis and with the same distance between the pivot point to the rotational center axis as between the second pivot point and the rotational center axis. This may be advantageous as is ensures that the second body is balanced, enabling smooth rotation also at high angular speed.

According to some embodiments, the second body comprises two or more braking arms having different properties, such that the two or more braking arms are arranged to react differently to the rate of change of the angular speed of the second body. This may be an advantage as it permits tailoring the braking action of the rotational brake for different acceleration regimes. As an example, a rotational brake may comprise two braking arms. A first braking arm of the two braking arms may be arranged to react on a relatively low angular acceleration of the second body, whereas a second braking arm of the two braking arms may be arranged to react on a higher angular acceleration of the second body. The rotational brake of the example may hereby provide a braking power that show two distinct characteristics for two different ranges of angular acceleration.

One application where such a rotational brake may be an advantage is for a fishing reel. During casting, a first phase may be defined as the time period during which the bait is cast forward through the air. During this phase, the braking action of the rotational brake must be high enough to avoid backlash but at the same time not too high as that would limit the length of the cast. Thus, a rotational brake in such a fishing reel may comprise one or more first braking arms arranged to fulfill the requirements of the first phase. These one or more first braking arms may be arranged to respond to a first negative angular acceleration of the second body. A second phase may be defined from the time the bait hits the water and onwards. During this phase, the bait decelerates quite heavily due to the contact with the water surface. Thus, it may be beneficial if the rotational friction brake would provide a higher braking power in the second phase than in the first phase to avoid backlash. According to some embodiments, the higher braking power in the second phase may be achieved by the same one or more first braking arm already actuated during the first phase, the increased braking power being accomplished by the rate of change of the angular speed of the second body. However, for alternative embodiments, the rotational brake may comprise one or more second braking arms, which during the first phase are arranged to reside in a non-braking position. The one or more second braking arms may be arranged to respond to a second negative angular acceleration of the second body, the second negative angular acceleration being higher than the first negative angular acceleration, thus providing a stronger braking power to the spool.

According to some embodiments, the position of the at least one stop member is adjustable, allowing for the second angle α2 to be varied. This may be advantageous as it makes it possible to influence in which regimes braking will occur, the regimes being either the regime of positive angular acceleration or negative angular acceleration.

According to some embodiments, the rotational friction brake further comprises at least one preventing member arranged to be adjustable, allowing for the angle α to be limited to a maximum angle smaller than the angle α1. This may be advantageous as is makes it possible to disable the brake manually. This may be of importance especially when rotating the second body counter to its intended rotational direction.

According to some embodiments, the rotational friction brake further comprises a further body, the further body being arranged to rotate around the rotational center axis of the second body, wherein the at least one preventing member is fixedly attached to the further body, wherein each of the at least one preventing member is arranged to prevent the braking member of each corresponding braking arm from frictionally engaging the first body when the further body is rotated in relation to the second body along a first rotational direction. The first rotational direction may advantageously be opposed to the reference direction, i.e. the rotational direction of the second body with respect to the first body. If the further body is connected to a rewinding interface used for rewinding the second body in the direction opposed to the reference direction, the further body may perform two tasks at once. The first task is to mechanically engage with the second body such as to rotate the second body in the direction opposed to the reference direction. The second task is to prevent each of the at least one braking member from frictionally engaging the first body. Thus, during the process of rewinding the second body, the brake will automatically be disabled.

According to some embodiments, the rotational friction brake further comprises a locking mechanism arranged to fix the at least one braking arm in relation to the second body when the braking member is not frictionally engaging the first body.

According to some embodiments, the locking mechanism comprises at least one first locking member arranged on the further body and at least one second locking member arranged on the at least one braking arm, wherein each of the at least one first locking member is arranged to lock onto a corresponding each of the at least one second locking member, such that each of the at least one braking arm can be locked in relation to the further body.

According to some embodiments, the second body is part of, fixedly attached to or arranged to engage with a spool arranged to contain an elongated bendable object. The elongated bendable object is winded around the spool at a plurality of revolutions. Systems comprising such bendable elongated objects may be for example spools housing electrical cables, wires, water hoses, paper, sewing cotton etc.

According to a second aspect, a fishing reel is provided, the fishing reel comprising the rotational friction brake of this disclosure, and wherein the first body is part of, or fixedly attached to, the housing of the fishing reel and the second body is part of, fixedly attached to or arranged to engage with a line spool.

According to a third aspect, a rotational friction brake regulated by the rate of change of the angular speed is provided. The rotational friction brake comprises a first body, a second body rotationally attached to the first body, and where the second body is arranged to rotate around a rotational center axis of the second body. The rotational friction brake further comprises at least one braking arm rotationally attached to the second body in a pivot point. The pivot point is eccentrically offset to the rotational center axis along a radial axis. The at least one braking arm comprises a braking member arranged to frictionally engage a part of the first body. The at least one braking arm has a mass center placed along a braking arm axis. The braking arm axis intersects the pivot point and forms an angle ß to a normal axis. The normal axis is defined perpendicular to the radial axis through the pivot point. The mass center is placed at a distance from the pivot point that is longer than a distance from the pivot point to the rotational center axis The braking member is arranged to frictionally engage the part of the first body for values of ß smaller than a first angle ß 1. The rotational friction brake further comprises at least one stop member arranged to prevent ß becoming larger than a second angle ß2, thus limiting movement of the at least one braking arm relative to the second body.

This embodiment of the rotational friction brake works mechanically similar to previously described embodiments. The difference is merely the shape of the at least one braking arm, wherein the braking member is arranged to frictionally engage the part of the first body on the other side of the pivot point, thus resulting in the dependence on the angular acceleration being reversed. The embodiment is advantageous as it makes it possible to initiate braking during a phase of positive angular acceleration, such as e.g. an undesired or unexpected positive angular acceleration. Examples of where the rotational friction brake 500 may be useful are safety brakes in various trolley system such as those used in elevators, cranes, skylifts etc.

According to one example embodiment, the braking member is elastic, or provides resilience, allowing the braking arm axis to assume an angle ß smaller than the first angle ß1, gradually increasing the friction with the decrease of the angle ß.

A further scope of applicability will become apparent from the detailed description given below. However, it should be understood that the detailed description and specific examples, while indicating preferred embodiments, are given by way of illustration only, since various changes and modifications within the scope of the claims will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTIONS OF THE DRAWINGS

The invention will by way of example be described in more detail with reference to the appended schematic drawings, which shows presently preferred embodiments.

Figure 13A:
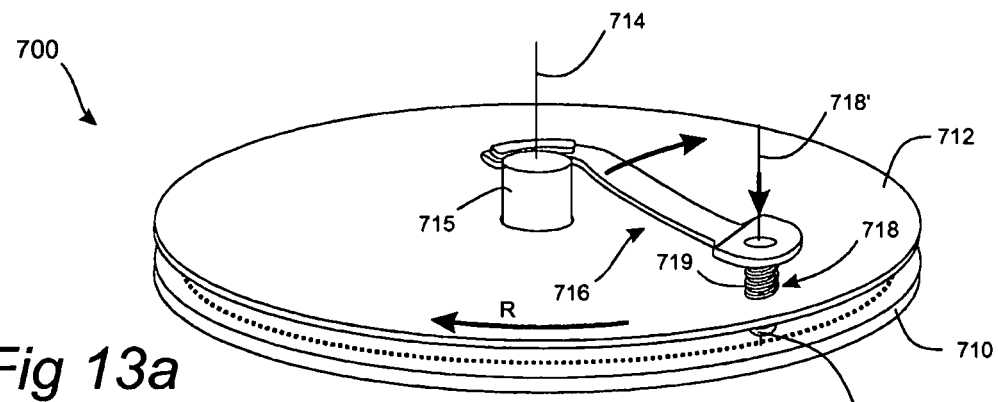
Figure 13B:
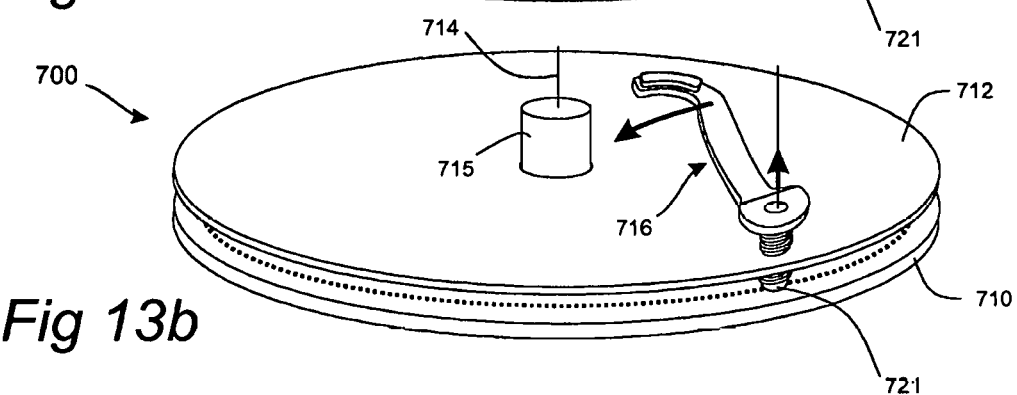

FIGS. 13a and b are perspective views of a rotational friction brake 700 according to example embodiments of the present disclosure where the braking arm is arranged to frictionally engage a surface of the first body orthogonal to the rotational center axis. FIG. 13a shows the rotational friction brake 700 when the braking arm is in a non-braking position whereas FIG. 13b shows the rotational friction brake 700 when the braking arm is in a braking position.

Figure 14:
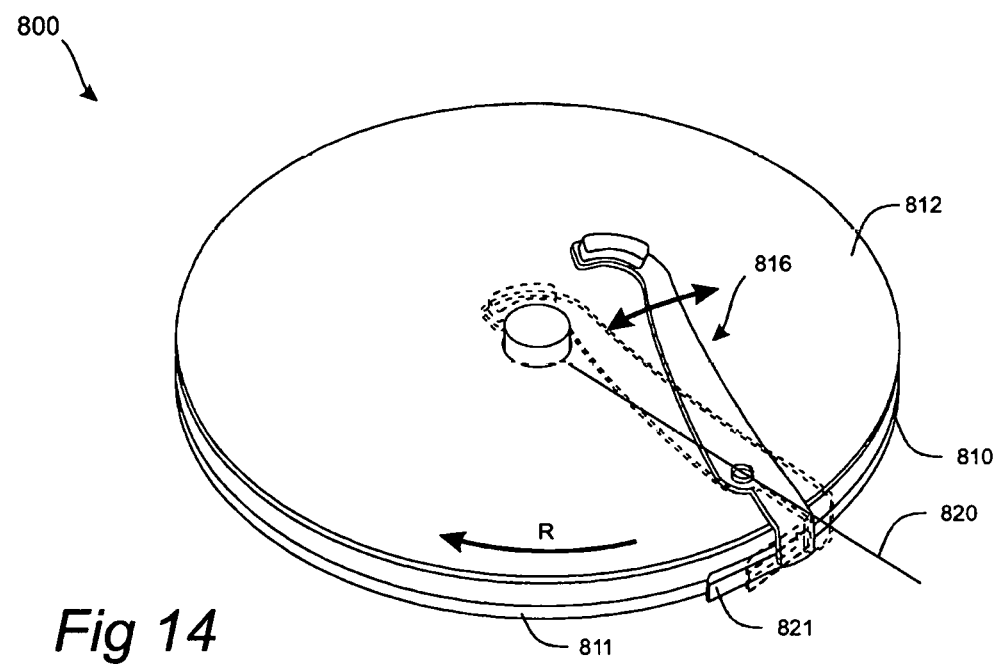

FIG. 14 is a perspective view of a rotational friction brake 800 according to example embodiments of the present disclosure where the braking arm is arranged to frictionally engage an outer peripheral surface of the first body.

Figure 15:
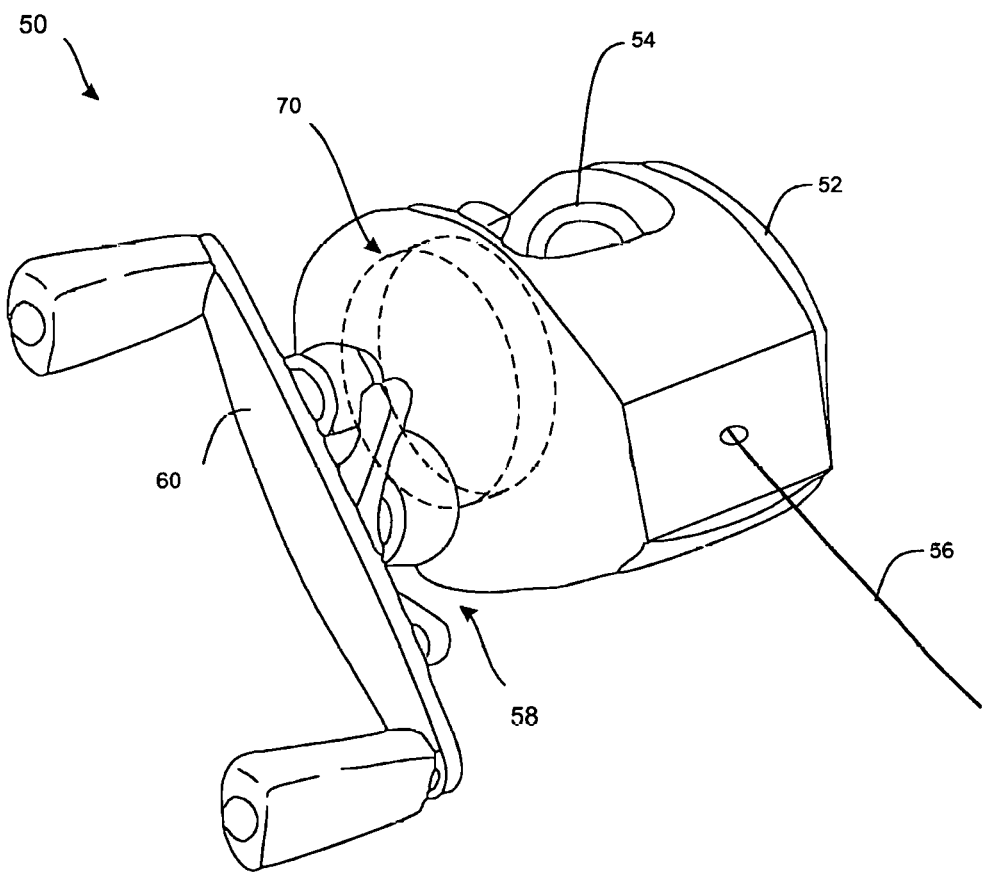

FIG. 15 is a perspective view of a fishing reel 50 according to example embodiments of the present disclosure, wherein the fishing reel 50 comprises a rotational friction brake according to the present disclosure.

Figure 16A:
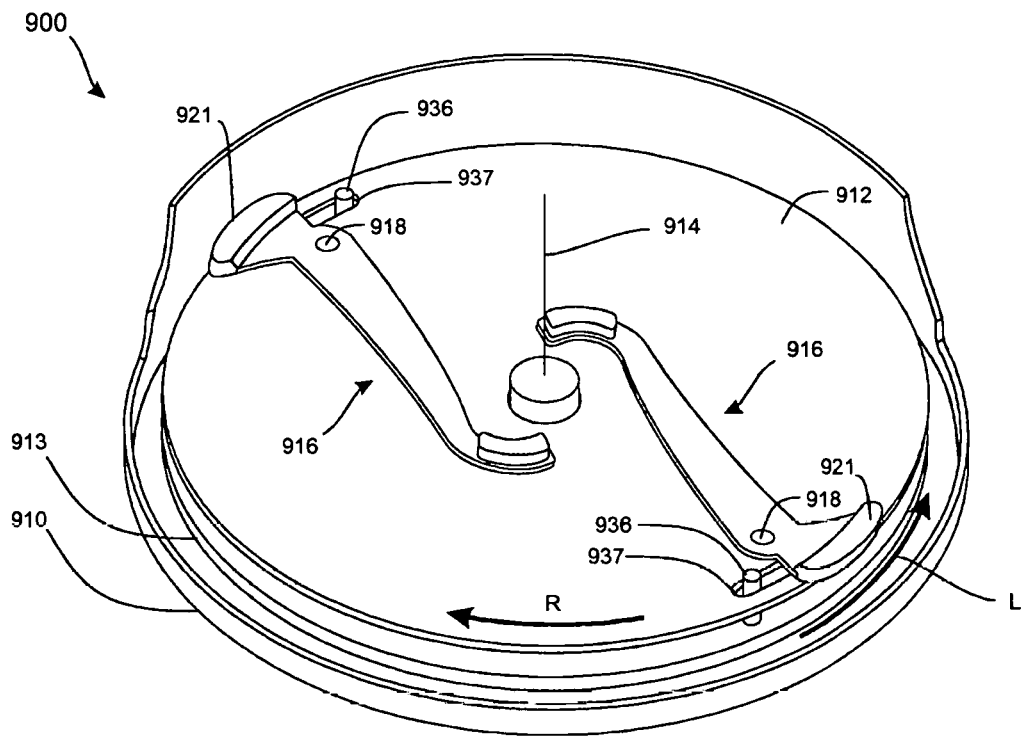
Figure 16B:
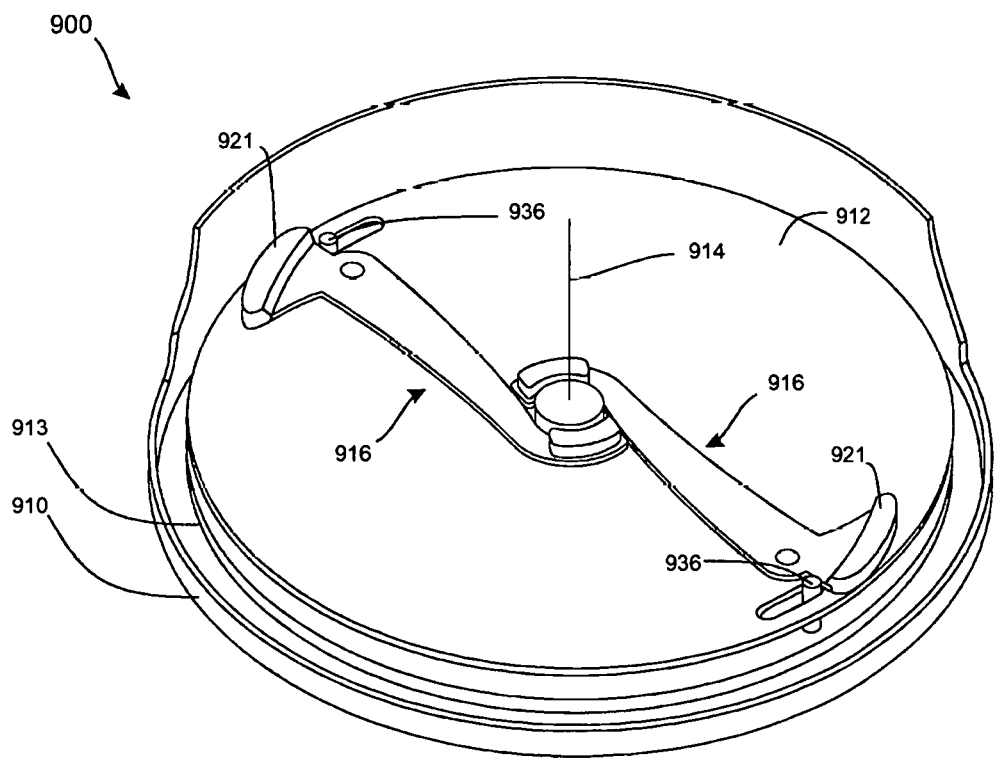

FIGS. 16a and b are perspective views of a rotational friction brake 900 according to example embodiments of the present disclosure. FIG. 16a shows the rotational friction brake 900 when the braking arms are in a non-braking position whereas FIG. 16b shows the rotational friction brake 900 when the braking arms is in a braking position. The front of the first body 910 has been cut open for clarity.

Figure 17A:
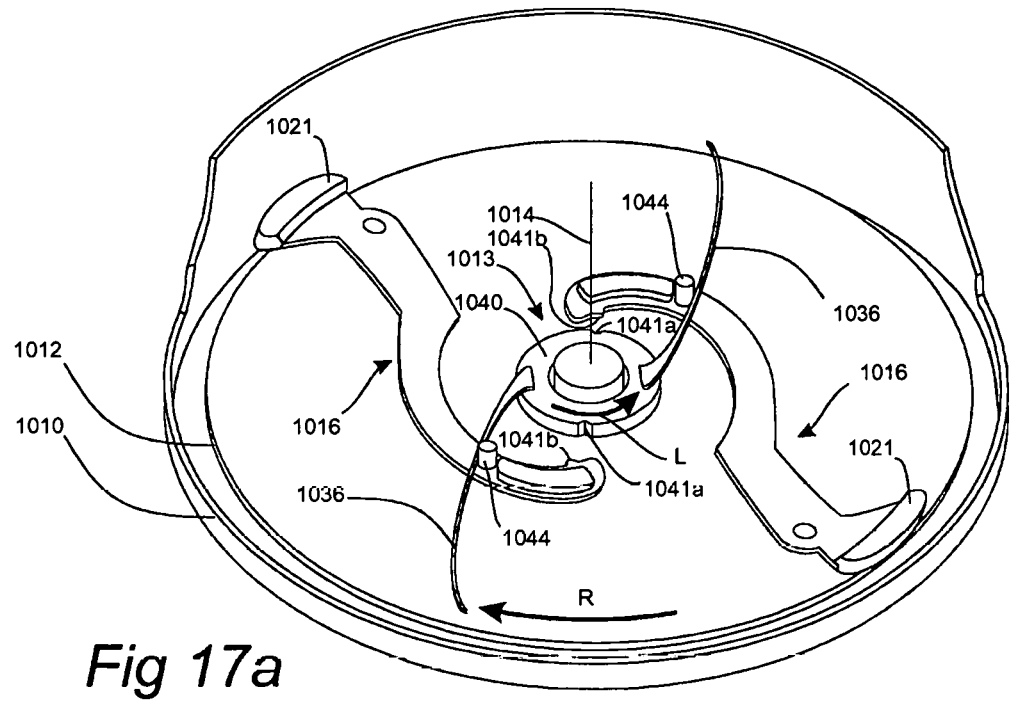
Figure 17B:
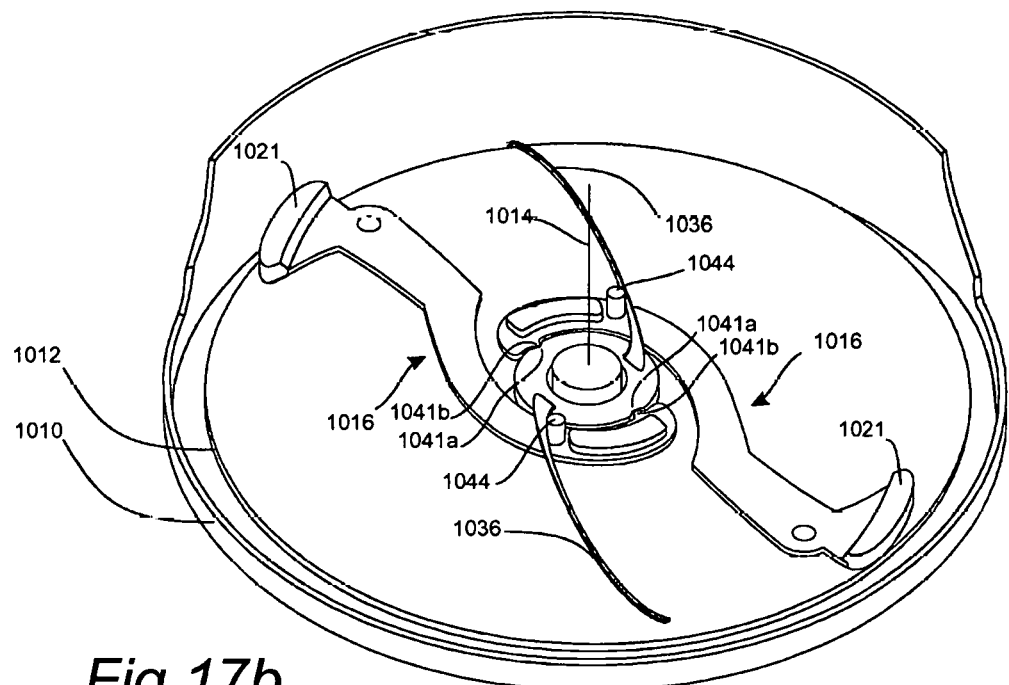

FIGS. 17a and b are perspective views of a rotational friction brake 1000 according to example embodiments of the present disclosure. FIG. 17a shows the rotational friction brake 1000 when the braking arms are in a non-braking position whereas FIG. 17b shows the rotational friction brake 1000 when the braking arms is in a braking position. The front of the first body 1010 has been cut open for clarity.

DETAILED DESCRIPTION

Figure 1:
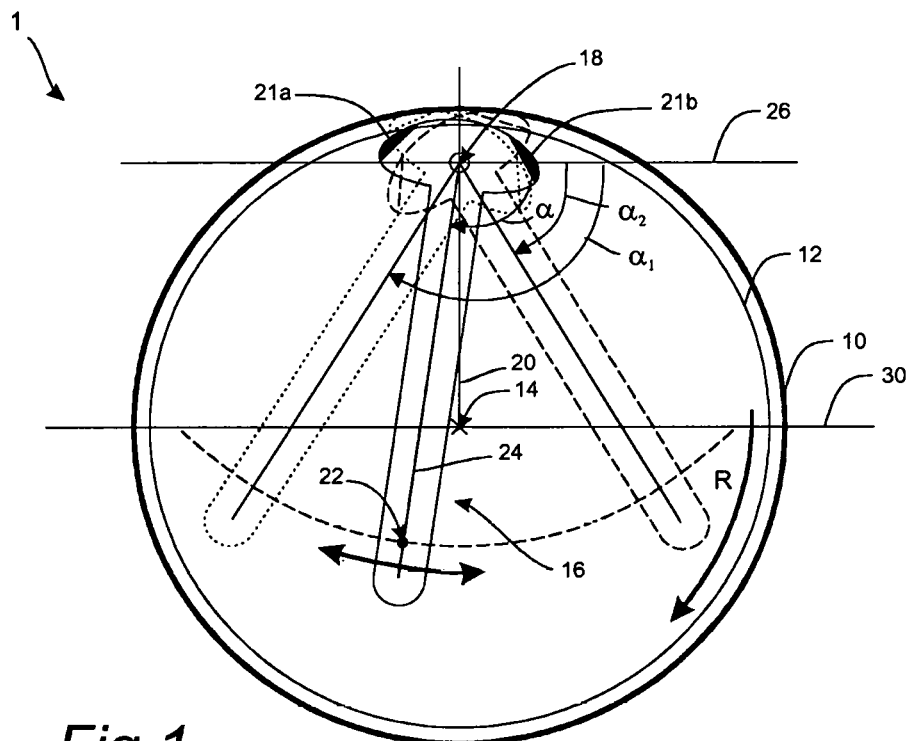
FIG. 1 is a schematic top view of a rotational friction brake 1 according to example embodiments of the present disclosure. The rotational friction brake 1 is actuated by a positive as well as a negative angular acceleration.

FIG. 1 illustrates a rotational friction brake 1 according to example embodiments of the present disclosure. The rotational friction brake 1 comprises a first body 10 and a second body 12 which is rotationally attached to the first body 10. The second body 12 is arranged to rotate around a rotational center axis 14 of the second body 12. The rotational friction brake 1 further comprises at least one braking arm 16 (in this example; one braking arm) which is rotationally attached to the second body 12 in a pivot point 18. The pivot point 18 is eccentrically offset to the rotational center axis 14 along a radial axis 20. The at least one braking arm 16 comprises a braking member 21a. In the example, the at least one arm further comprises a further braking member 21b. The braking members 21a, 21b are arranged to frictionally engage a part of the first body 10. Furthermore, the at least one braking arm 16 has a mass center 22 placed along a braking arm axis 24, which intersects the pivot point 18 and extends out, forming an angle $\alpha$ to a normal axis 26 defined perpendicular to the radial axis 20 through the pivot point 18. The mass center 22 is placed at a distance from the pivot point 18 that is longer than a distance from the pivot point 18 to the rotational center axis 14. To achieve such a position of the mass center 22 with respect to the at least one braking arm 16, a portion of the at least one braking arm 16 is made out from a material with a density higher than the average density of the at least one braking arm 16. The portion may for example be made out of a metal. Rotational braking of the second body occurs by frictional contact between one from the braking member 21a, 21b and the first body 10. The first body 10 may be for example a drum and the braking member 21a,21b is then arranged to frictionally engage an inner portion of a peripheral wall of the drum. The braking member 21a,21b is arranged to frictionally engage the part of the first body 10 for values of $\alpha$ larger than a first angle $\alpha 1$ and smaller than a second angle $\alpha 2$, wherein the first angle $\alpha 1$ is larger than the second angle $\alpha 2$.

The rotational friction brake 1 shown in FIG. 1 will be actuated both during a phase of a positive rate of change of the angular speed (i.e. positive acceleration) of the second body 12 and in a phase of a negative rate of change of the angular speed (i.e. negative acceleration, alternatively referred to as deceleration) of the second body 12. Depending on the application, the braking power may be adjusted such that it is different for the case of a positive angular acceleration and a negative angular acceleration of the second body 12. This can be done by shaping the braking members 21a,21b differently. Alternatively, or additionally, it may be achieved by designing the braking members differently, such as for example choosing different materials.

Figure 2:
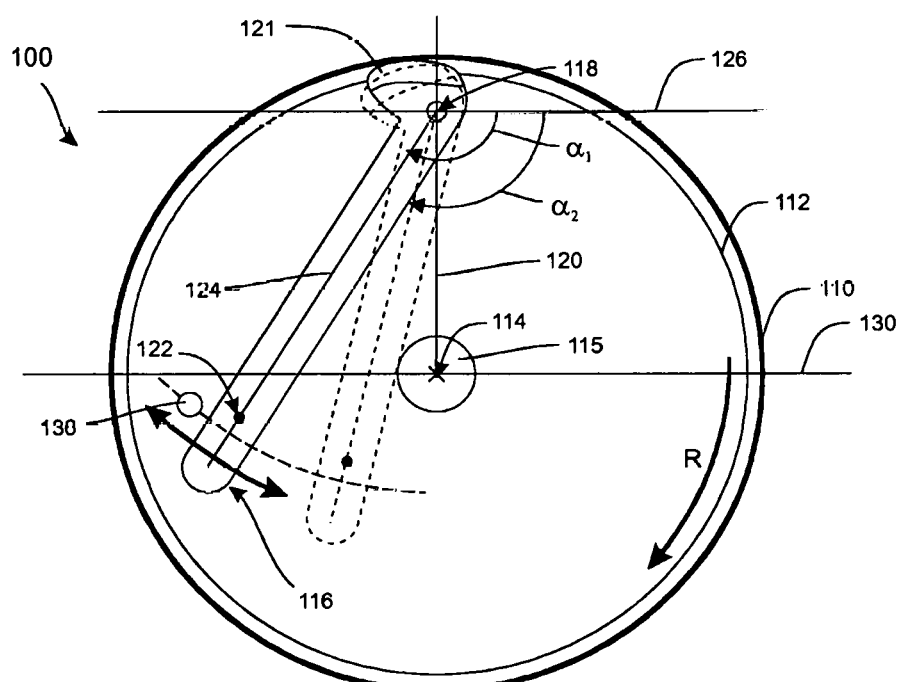
FIG. 2 is a schematic top view of a rotational friction brake 100 according to example embodiments of the present disclosure. The rotational friction brake 100 is actuated by a negative angular acceleration when the second body rotates in the reference direction R.

In some applications, braking may not be desirable for both a positive and a negative angular acceleration of the second body 12. For such applications, the at least one braking arm 16 may be prevented from making contact with the first body 10. This may be achieved by limiting the movement of the at least one braking arm 16 to a specific range of angles of the angle α such that one from the braking member 21a,21b cannot make contact with the first body 10. FIG. 2 shows an example of a rotational friction brake 100 wherein the angle interval is limited. If operated along the reference direction R in FIG. 2, the rotational friction brake 100 will be actuated by a negative angular acceleration of the second body 120.

FIG. 2 illustrates a rotational friction brake 100 according to embodiments of the present disclosure. The rotational friction brake 100 comprises a first body 110 and a second body 112 which is rotationally attached to the first body 110. The second body 112 is arranged to rotate around a rotational center axis 114 of the second body 112. The rotational friction brake 100 further comprises at least one braking arm 116 (in this example; one braking arm) which is rotationally attached to the second body 112 in a pivot point 118. The pivot point 118 is eccentrically offset to the rotational center axis 114 along a radial axis 120. The at least one braking arm 116 comprises a braking member 121 arranged to frictionally engage a part of the first body 110. Furthermore, the at least one braking arm 116 has a mass center 122 placed along a braking arm axis 124, which intersects the pivot point 118 and extends out, forming an angle α to a normal axis 126 defined perpendicular to the radial axis 120 through the pivot point 118. The mass center 122 is placed at a distance from the pivot point 118 that is longer than a distance from the pivot point 118 to the rotational center axis 114. To achieve such a position of the mass center 122 with respect to the at least one braking arm 116, a portion of the at least one braking arm 116 is made out from a material with a density higher than the average density of the at least one braking arm 116. The portion may for example be made out of a metal. Rotational braking of the second body occurs by frictional contact between the braking member 121 and the first body 110. The first body 110 may be for example a drum and the braking member 121 is then arranged to frictionally engage an inner portion of a peripheral wall of the drum. The braking member 121 is arranged to frictionally engage the part of the first body 110 for values of α larger than a first angle α1. At least one stop member 115 (in this example; one stop member) is arranged to prevent α to become smaller than a second angle α2, thus limiting movement of the at least one braking arm 116 relative to the second body. The stop member 115 may be an integrated part of the second body 112 or be attached to the second body 112. The stop member may, however, also be a part of the first body 110, e.g. in form of a shaft placed along the center axis 114 or, in case of the first body 110 being a drum, the drum wall could function as a stop member (not shown). If the stop member is part of or attached to the first body 110 it is important to minimize the frictional braking force inflicted by the contact between the braking arm and a stop member of the first body 110.

It is to be understood that the rotational friction brake may have more than one braking arm. Each of the braking arms, if these are more than one, will have their respective pivot point, mass center and braking member etc. The number of stop members may also vary. There may be one stop member for each braking arm, but it may, alternatively, be fewer stop members than braking arms. For example, one stop member may act on several braking arms.

It is emphasized that the rotational friction brake does not require the at least one braking arm 116 to comprise a material with higher density than the average density of the braking arm 116. The position of the mass center 122 as claimed may also be realized using a braking arm 116 with uniform, or near uniform density, where the design of the at least one braking arm 116 instead ensures the correct position of the mass center 122. Such a design may for example comprise a larger volume of material at one position of the at least one braking arm 116, thus ensuring the mass center 122 to be located close to the large volume.

In the example embodiment, the braking member 121 is elastic, or provides resilience, allowing the braking arm axis 124 to assume an angle α larger than the first angle α1 which makes it possible to gradually increase the friction with an increase of the angle α for α>α1.

Figure 3A:
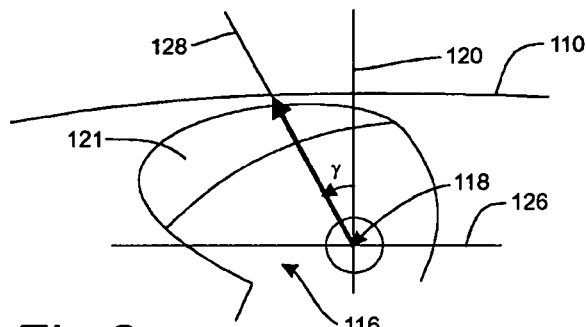
FIG. 3a is a detailed top view of the braking member while being in its non-braking position, i.e. for $\alpha<\alpha 1$, for the rotational friction brake 100 shown in FIG. 2.
Figure 3B:
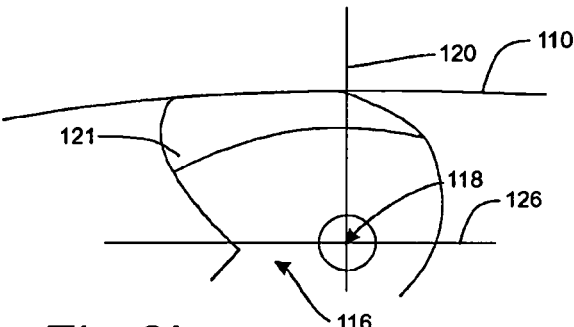
FIG. 3b is a detailed view of the braking member while being in its braking position, i.e. for $\alpha>\alpha 1$, for the rotational friction brake 100 shown in FIG. 2.

A braking member may be shaped in different ways. For example, a braking member may be shaped such as to make contact with the first body at a position close to the pivot point whereby the area of contact, with increasing compression, increases outwardly such that the area of contact covers areas further away from the point. This is the case for the rotational friction brake 100 shown in FIG. 2. The shape of the braking member 121 of FIG. 2 will be further discussed with reference to FIG. 3a showing the braking member 121 in its non-braking position, i.e. when α<α1. The part of the braking member 121 adapted to be in contact with the first body 110 during braking has a shape designed to increase the area of contact between the braking member 121 and the first body 110 for increasing values of the angle α. This shape is designed such that the distance between the pivot point 118 and the outer periphery of the braking member 121, the distance being defined along a distance axis 128 taking the angle γ with respect to the radial axis 120, will be increasing with an increase in the angle γ when the at least one braking arm 116 is not in contact with the first body 110, i.e. for α<α1 where the braking member 121 is uncompressed. For all positions of the at least one braking arm 116 where braking occurs, i.e. for α>α1, the braking member 121 will, to varying degree, be compressed as shown in FIG. 3b. Dependent on the degree of compression, the shape of the braking member 121 will result in the area of contact to increase with the angle α. The braking will depend on the contact area but also on the thickness and properties of the braking member 121. For instance, if the braking member 121 is made from an elastic material, it may be preferable if the thickness of the braking member 121 increases with the angle γ.

It is to be understood from FIG. 1 and FIGS. 3a-b that the portion of the first body 110 at which contact is made by the braking member 121 is located at a position with respect to the pivot point 118, the position being located in a direction from the pivot point 118 generally counter to the tangential velocity of the pivot point 118. Thus, the braking member 121 will make contact with the first body 110 at an angular position being earlier (i.e. smaller angle) than the angular position of the pivot point 118 when the second body 112 is rotating in the reference direction R. Such rotational friction brakes, the rotational friction brake 100 included, belong to a first category of rotational friction brakes for which braking action is achieved during a negative angular acceleration of the second body. In alternative embodiments, the portion of the first body at which contact is made by the braking member may be located at a position with respect to the pivot point, the position being located in a direction from the pivot point generally directed along the direction of the tangential velocity of the pivot point 118. In such a case, the braking member will make contact with the first body at an angular position being before (i.e. larger angle) than the angular position of the pivot point when the second body is rotating in the reference direction R. Such rotational friction brakes belong to a second category of rotational friction brakes wherein braking action is achieved during a positive angular acceleration of the second body.

It is understood that, although embodiments of the rotational friction brake may be specifically designed for either one (or both, see FIG. 1) of these categories, any rotational friction brake within the scope of the claims belonging to the first category will essentially operate as a brake belonging to the second category if operated along a rotational direction opposed to the reference direction R.

Figure 4A:
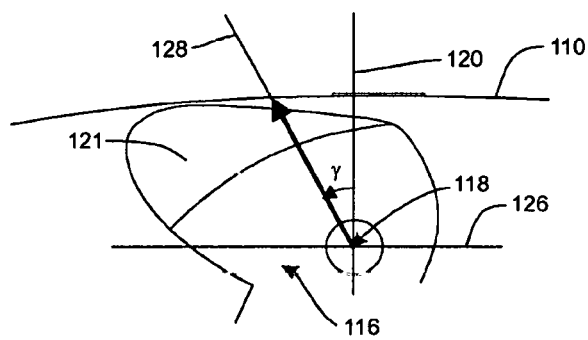
FIG. 4a is a detailed top view of a braking member according to an alternative example embodiment, the view visualizing the braking member in its non-braking position, i.e. for $\alpha<\alpha 1$.
Figure 4B:
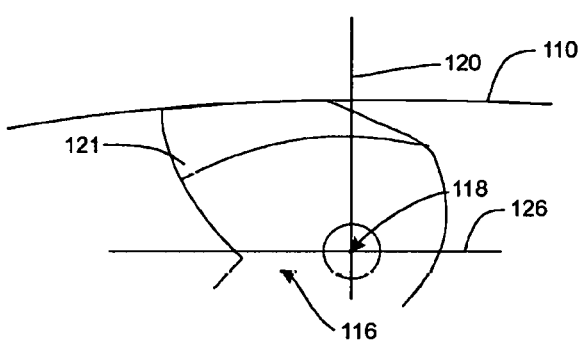
FIG. 4b is a detailed top view of a braking member according to the example embodiment shown in FIG. 4a, the view visualizing the braking member in its braking position, i.e. for $\alpha<\alpha 1$.

FIGS. 4a and 4b shows an alternative shape of the braking member 121', wherein the braking member 121' is shaped such as to make contact with the first body 110 at a position at a distance from the pivot point 118 whereby the area of contact, with increasing compression, increases inwardly such that the area of contact covers areas closer to the pivot point 118.

The elastic properties of the braking member 121 may be obtained by using an elastic material, such as for example rubber, plastic materials etc., but may also be achieved by the braking member 121 comprising springs. These springs may be arranged to take up a volume between the outer periphery of the braking member 121 and the rest of the at least one braking arm 116, where the springs will be compressed.

Figure 5:
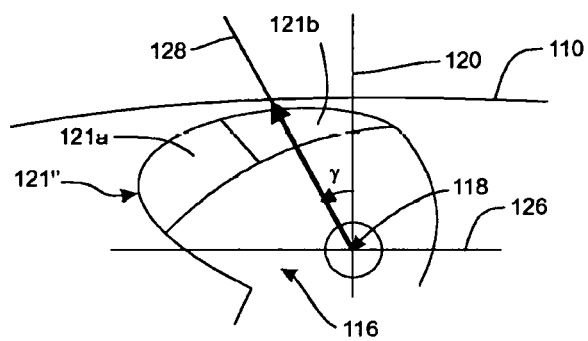
FIG. 5 is a top view of a braking member comprising more than one portion, the view visualizing the braking member in its non-braking position, i.e. for $\alpha<\alpha 1$.

FIG. 5 shows a braking member 121" in an alternative design. The braking member 121" has the same shape as the braking member 121, but comprises two or more portions 121a,121b (in the example: two portions) wherein each of the two or more portions 121a,121b have its own set of material properties. Specifically, in the example embodiment, the two or more portions 121a,121b comprises different materials with different material properties.

Figure 6:
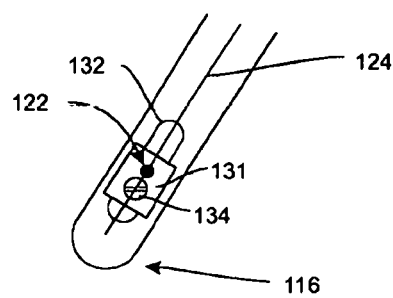
FIG. 6 is a detailed top view of parts of the at least one braking arm for the rotational friction brake 100 of FIG. 2, showing how the mass center may be adjusted with respect to the at least one braking arm.

The distance between the mass center 122 and the pivot point and/or the angle $\alpha 2$ may be varied by varying the position of the mass center 122 relative to the at least one braking arm 116. This is achieved by securing a weight 131 to the rest of the at least one braking arm 116 using a screw 134. The weight is movable along an elongated hole 132 as shown in FIG. 6. The elongated hole 132 does not need to be parallel with the braking member axis, and may also be shaped nonlinearly thus making it possible for higher degrees of freedom when adjusting the position of the mass center 122.

The braking action of the rotational friction brake 100 is achieved when the at least one braking arm 116 is in physical contact with the first body 110. To prevent undesired braking to occur on systems equipped with embodiments disclosed herein, the movement of the at least one braking arm 116 may be limited by a manual operation by a user, thus disabling the brake. This is shown in FIG. 2 where the rotational friction brake 100 further comprises at least one preventing member 136 (in the example; one preventing member) arranged to be adjustable. The at least one preventing member 136 may be used to prevent the at least one braking arm 116 to reach positions where the angle $\alpha > \alpha 1$, i.e. where braking occurs. The at least one preventing member 136 may be part of the second body 112 and thus be arranged to rotate with it. It may also be part of the first body 110. One realization of the latter could be using a circular hole with adjustable diameter constraining the at least one braking arm 116 to positions within the circular hole. One solution would be using a plurality of plates together forming the hole, such as used in the iris of a camera. Alternatively, the at least one preventing member 136 may be part of a further body rotationally attached to the first body 110 and/or the second body 112, the further body being equipped with at least one arm extending in a generally radial direction, each one of the at least one arm being arranged to force each one of the at least one braking arm 116 towards smaller $\alpha$ when rotating the further body with respect to the second body 112. The further body could for example be connected to a rewinding interface by which the second body 112 is actively rotated in the rotational direction counter to the reference direction R. During such a rewinding process, the rotational friction brake 100 will not be allowed to brake, as the at least one braking arm 116 are actively prevented from reaching angles $\alpha > \alpha 1$ by the at least one preventing member 136. Further details on how to limit movement of the at least one braking arm using preventing members will be disclosed in a later section of the disclosure.

The braking action of the rotational friction brake will now be explained with reference to the rotational friction brake 100 shown in FIG. 2. The description will, however, be equally valid for other embodiments within the scope of the claims.

The braking action of the rotational friction brake 100 can be explained by investigating the mechanical forces and moments exerted on the at least one braking arm 116 (in this example; one braking arm) in the reference system of the rotating second body 112. The mechanical forces and moments will result in a net moment M at the pivot point 118, the net moment M being responsible for the movement of the at least one braking arm 116 in the reference system of the rotating body 112. The braking action will be dependent on the angular acceleration of the rotating second body 112, as a result from the angular acceleration introducing a moment of inertia on the at least one braking arm 116. However, the braking action is also dependent on the centrifugal forces acting on the at least one braking arm 116 and the frictional forces acting on the braking member 121 of each of the at least one braking arm 116 when in contact with the first body 110. The three different sources of forces/moments are together forming a balance of moments on the at least one braking arm 116 at the pivot point 118 in the reference system of the rotating body 112, a balance of moments enabling to achieve a smooth rotational braking of the second body 112 with respect to the first body 110 within a range of angular speeds and within a range of angular acceleration. For clarity, each of these sources of forces/moments will first be discussed separately.

As the second body 112 is subjected to a positive rate of change in the angular speed (i.e. a positive angular acceleration) when rotating in the reference direction R shown in FIG. 1a, the at least one braking arm 116 will be experiencing a moment of inertia, the moment of inertia resulting in a moment at the pivot point 118 referred to here as M1. If it is assumed that rotation always commences clockwise (direction R in FIG. 1a), a positive angular acceleration of the second body 112 will result in M1 being directed counterclockwise, hence striving to move the at least one braking arm 116 towards smaller angles $\alpha$ whereas a negative angular acceleration of the second body 112 will result in M1 being directed clockwise hence striving to move the at least one braking arm 116 towards larger angles $\alpha$. The moment of inertia, and hence also M1, depends on the angular acceleration of the second body 112.

When the second body 112 is rotating, the at least one braking arm 116 will be subjected to centrifugal forces at all parts of its volume. For simplicity, we simplify and assume that the centrifugal force acts on the mass center 122 only. The centrifugal force is always acting radially outwardly with reference to the rotating object, in this case the second body 112. Studying FIG. 1, it is then evident that the centrifugal force acting on the mass center 122 will result in a moment M2 at the pivot point 118 directed clockwise, hence striving to increase the angle $\alpha$. The centrifugal force, and hence also M2, increases as the mass center 122 moves radially outwards, i.e. when the angle $\alpha$ increases. The centrifugal force also depends on the angular speed of the rotating body 112.

If the at least one braking arm 116 moves radially outwardly such that the angle $\alpha$ becomes equal to the first angle $\alpha 1$, the braking member 121 will make contact with the first body 110. This contact will result in frictional forces between the braking member 121 and the first body 110, frictional forces which are responsible for rotatably braking the second body 112 with respect to the first body 110. However, in the reference system of the rotating second body 112, the frictional forces also affect the at least one braking arm 116 by creating a moment M3 around the pivot point 118 directed counter-clockwise. This moment will strive to rotate the at least one braking arm 116 such that it decreases the angle $\alpha$. Thus, M3, resulting from the frictional forces, will act to balance M2, resulting from the centrifugal forces. M1 will act either clockwise or counter-clockwise dependent on if the second body 112 has a positive angular acceleration or a negative angular acceleration, respectively.

As the braking member 121 is elastic, or provides resilience, there will be a range of angles $\alpha$ larger than the first angle $\alpha 1$, where the second body 112 will experience braking, but to different degree dependent on a. Additionally, the elasticity/resilience of the braking member 121 will contribute to the moment M3.

Studying the rotational friction brake 100 shown in FIG. 2 and considering the mechanical forces and moments affecting the at least one braking arm 116 as discussed above, it is now possible to discuss the operation of the rotational friction brake 100. During a positive angular acceleration of the second body 112 from zero speed, in the reference direction R, the at least one braking arm 116 will experience a moment of inertia resulting in a moment M1 at the pivot point 118 in the reference system of the rotating second body 112. When the angular speed is low, M2 is negligible, resulting in a net moment at the pivot point 118 in the counter clockwise direction. Hence the at least one braking arm 116 will be forced to a position in which the angle $\alpha$ will be equal to $\alpha 2$. As rotational speed increases, centrifugal forces acting on the at least one braking arm 116 will increase, thus steadily increasing the moment M2, which is directed clockwise. At a certain rotational speed, the magnitude of M2 will be larger than the magnitude of M1. At the corresponding point in time, in the reference system of the rotating body 112, the at least one braking arm 116 will start moving radially outwardly, thus increasing the angle $\alpha$. When the at least one braking arm 116 has moved far enough for the angle $\alpha$ to be equal to $\alpha 1$, the braking member 121 of each one of the at least one braking arm 116 will make contact with the second body 110, resulting in an initiation of rotational braking of the second body 112. During braking, the frictional forces will, in the reference system of the rotating second body 112, result in the moment M3 at the pivot point 118, directed counterclockwise, which thus will counteract the moment M2 acting on the at least one braking arm 116. The magnitude of the net moment at the pivot point 118 will thus be reduced, with the effect of decreasing the angle $\alpha$ thus reducing the friction. This, in turn reduces the moment M3, thus increasing the net moment, etc. The rotational friction brake is thus self-balancing. By a detailed analysis and design of the parts and materials from which they are made, the rotational friction brake disclosed herein may be realized in different versions, each providing different response of the braking action dependent on its intended use.

For the rotational friction brake 100 illustrated in FIG. 2, the shape of the at least one braking arm 116 and the position and dimensions of the at least one stop member 115 is chosen such that the braking arm axis 124 will always form angles $\alpha$ larger than 90°, i.e. $\alpha 2 > 90°$. If, instead, the at least one braking arm 116 and/or the at least one stop member 115 are designed and/or located differently, it is possible to achieve a brake where the angles $\alpha$ will be smaller than 90°, i.e. $\alpha 2 < 90°$. The technical effect of the second angle $\alpha 2$ is to adjust the relative importance of the moment of inertia due to the angular acceleration, with respect to the centrifugal forces. The rotational friction brake 100 in FIG. 1$a$ will be relatively sensitive to the centrifugal forces as these will result in a moment M2 of the at least one braking arm 116 around the pivot point 118 directed clockwise for all values of $\alpha$. For instance, the rotational friction brake 100 will be braking at constant rotational speed of the second body 112. A rotational friction brake where $\alpha 2 < 90°$ will instead result in the centrifugal forces creating a moment M2 of the at least one braking arm 116 around the pivot point 118 directed counterclockwise. In case a is equal to $\alpha 2$, the at least one braking arm 116 may be trapped in a stable position when the second body 112 is rotating at constant angular speed, hence not braking. For an increase of the angle $\alpha$ to occur, a negative angular acceleration will be needed which is strong enough to create a (clockwise) moment M1 of the at least one braking arm 116 at the pivot point 118 with a magnitude exceeding the magnitude of the counterclockwise moment M2 of the at least one braking arm 116 created by the centrifugal forces. Thus, brakes with different behavior may be obtained just by adjusting the second angle $\alpha 2$.

Figure 7:
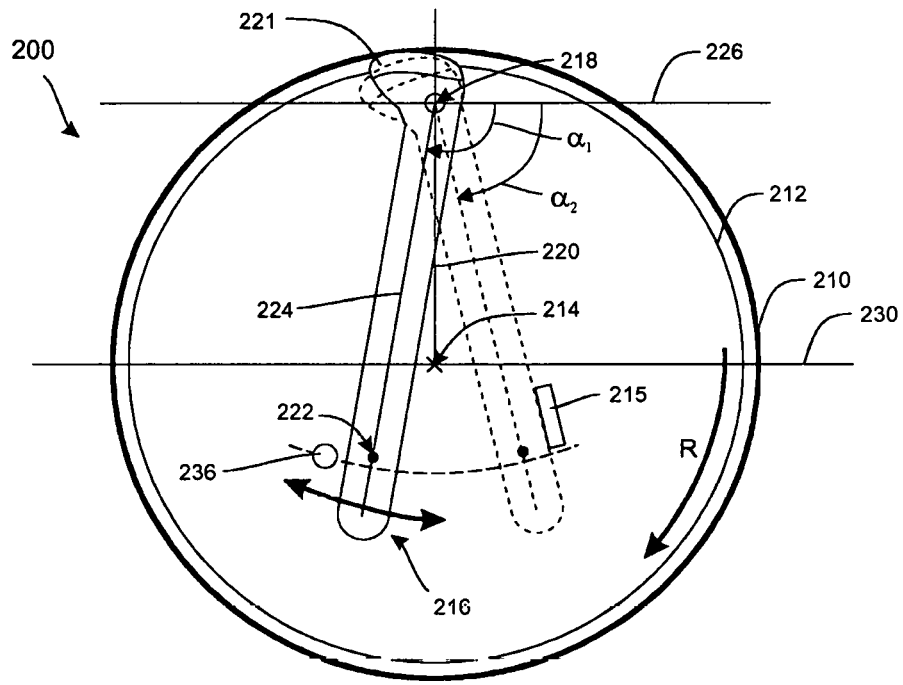
FIG. 7 is a schematic top view of a rotational friction brake 200 according to example embodiments of the present disclosure in which $\alpha 2<90°$.
Figure 8:
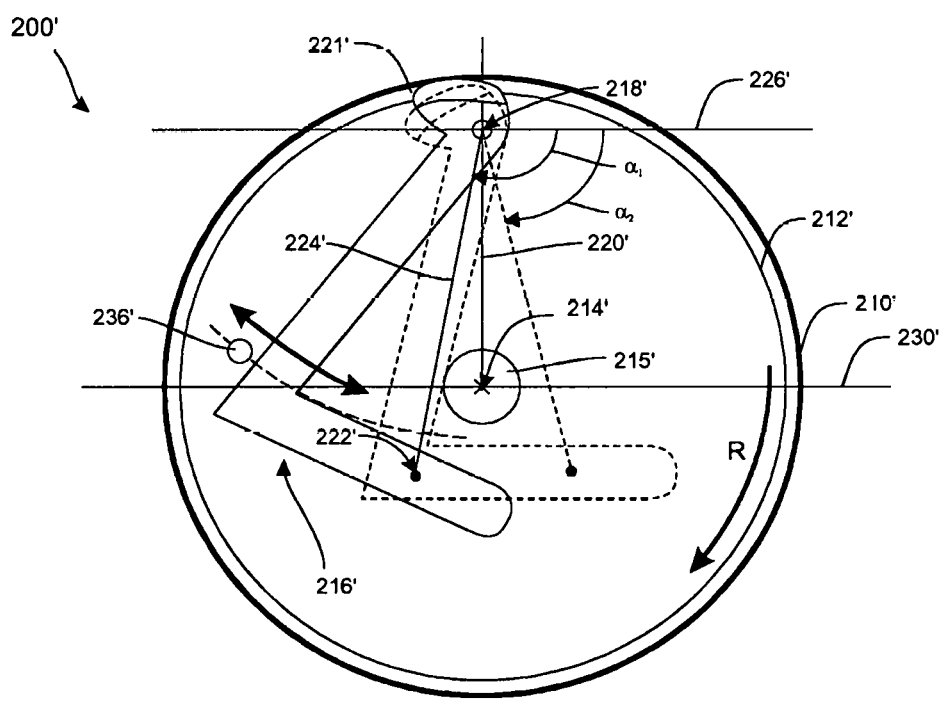
FIG. 8 is a schematic top view of a rotational friction brake 200' according to example embodiments of the present disclosure where $\alpha 2<90°$.

FIG. 7 shows a rotational friction brake 200 according to embodiments of the disclosure, for which $\alpha 2 < 90°$. For the rotational friction brake 200, the at least one stop member 215 (in the example; one stop member) is arranged to allow the braking arm 216 to reach positions defined by the angle $\alpha$ being less than 90°. In this embodiment, the at least one braking arm 216 (in the example; one braking arm) must be able to freely pass the position of the rotational center axis 214, which may not always be practical. FIG. 8 shows a rotational friction brake 200' according to embodiments of the disclosure, wherein the at least one stop member 215' (in the example; one stop member) is positioned coaxially with the rotational center axis 214' and the at least one braking arm 216' (in the example; one braking arm) is shaped nonlinearly, allowing the mass center 222' of the at least one braking arm 216' to reach positions complying with the requirement $\alpha 2 < 90°$.

Referring once more to FIG. 2 and FIG. 6, it is stressed that the position of the mass center 122 of the at least one braking arm 116 has big influence on the behavior of the at least one braking arm 116, and hence also on the operation of the rotational friction brake 100. From the description of the principle by which the rotational friction brake 100 works, it should be understood that the mass center 122 always will be limited to a specific range of angles $\alpha$ as a result from the at least one braking arm 116 making contact with the at least one stop member 115 at α2 and the first body 110 at, or slightly larger than, α1.

Preferably, the location of the mass center 122 should be limited to a certain region. This may be advantageous as it prevents the at least one braking arm 116 reaching positions with angles α large enough for the centrifugal forces to become too dominant. If the centrifugal forces become too dominant, it may result in the rotational friction 100 brake braking undesirably often and/or to an undesirably high degree.

One preferred such region is within a cylindrical volume, coaxial with the rotational center axis 114, with a circular cross sectional area orthogonal to the rotational center axis 114 of the second body 112, and with a radius of the circular cross sectional area being equal to the distance between the rotational center axis 114 and the pivot point 118. Thus, for embodiments utilizing the preferred region, the mass center 122 is not allowed to leave the physical boundaries of the second body 112.

Another preferred such region is for the mass center 122 to be located on the side of a plane 130 not containing the pivot point 118. The plane 130 is here defined orthogonal to the radial axis 120 and intersects the rotational center axis 114.

Another preferred such region may be defined using the angle α. It may be desirable that the second angle α2 is within the range 80°<α2<100°.

It may desirable that the second angle α2 is within the range 88°<α2<95°.

It may desirable that the second angle α2 is within the range 90°<α2<95°.

The rotational friction brake in this disclosure has now been explained. It is understood that this explanation, although presented for selected example embodiments, is equally true for all embodiments disclosed herein and also for any embodiment not disclosed herein but within the scope of the claims.

Figure 9:
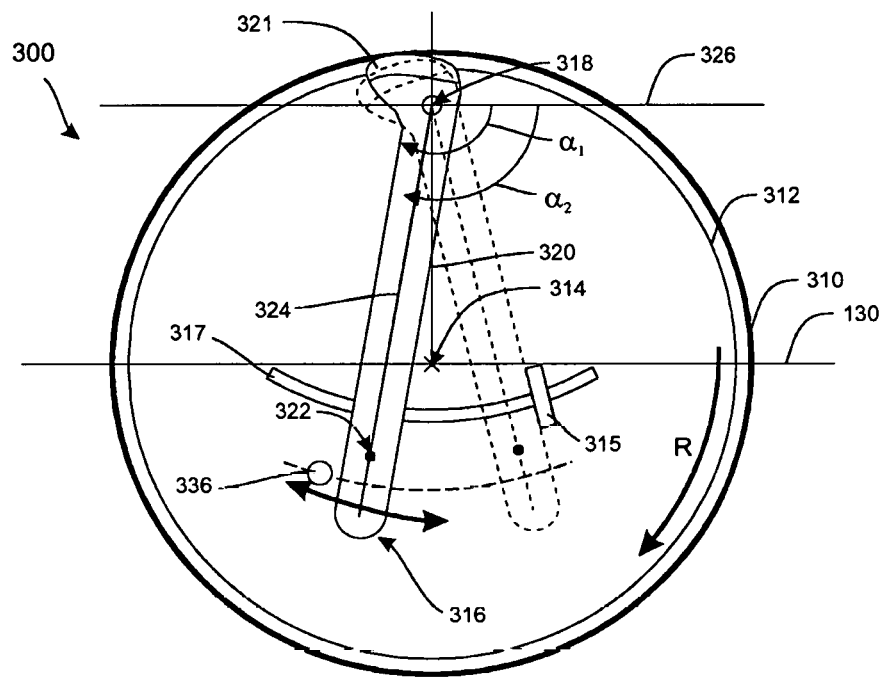
FIG. 9 is a schematic top view of a rotational friction brake 300 according to example embodiments of the present disclosure where the at least one stop member may be adjusted, thus adjusting the second angle $\alpha 2$.

FIG. 9 showing a rotational friction brake 300 according to alternative embodiments of the disclosure. In the rotational friction brake 300, the at least one stop member 315 (in this example; one stop member) is arranged to be moved following a sliding groove 317, thus allowing the angle α2 to be varied by the user. In such embodiments it is thus possible to adjust the position of the at least one braking arm 316 with respect to the second body 312 during the phase of positive angular acceleration. This may be advantageous in applications where the sensitivity of the rotational friction brake 300 needs to be adjusted. The position of the at least one stop member 315 is adjusted by unsecuring the at least one stop member 315 with respect to the second body 312 using for example a screw or a pin. Once unsecured, the at least one stop member 315 may be adjusted in position, after which the at least one stop member 315 is fastened with respect to the second body 312 again.

Figure 10:
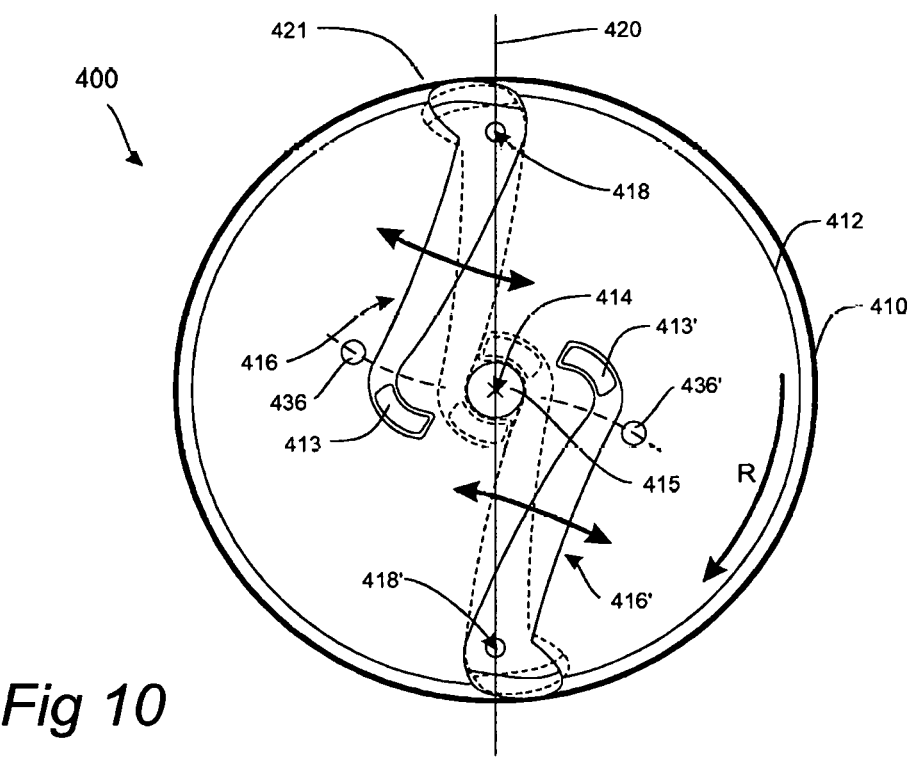
FIG. 10 is a schematic top view of a rotational friction brake 400 according to example embodiments of the present disclosure where the rotational friction brake comprises two braking arms.

FIG. 10 shows a rotational friction brake 400 according to alternative embodiments of the disclosure. For the rotational friction brake 400, the second body 412 comprises two braking arms 416,416'. The first of the two braking arms, 416, is rotationally attached to the second body 412 in the pivot point 418 whereas the second of the two braking arms, 416', is rotationally attached to the second body 412 in a second pivot point 418'. The pivot point 418 and the second pivot point 418' are located along the radial axis 420 on either side of the rotational center axis 414 and with the same distance between the pivot point 418 to the rotational center axis 414 as between the second pivot point 418' and the rotational center axis 414.

The advantage of the rotational friction brake 400 is that the rotating second body 412 will be balanced, thus allowing a smooth vibration-free rotation even at high angular speeds. Another advantage is that the use of two braking arms instead of one makes it possible to reduce the weight of each braking arm for the same braking power, increasing the durability of the mechanical parts. The advantages are obviously the same for embodiments where more than two braking arms are used. It is understood that any number of braking arms may in principle be used within the scope of the claims. Thus, for example, three or more braking arms may be used, rotationally attached to respective pivot points, the pivot points being evenly angularly spread apart.

Figure 11:
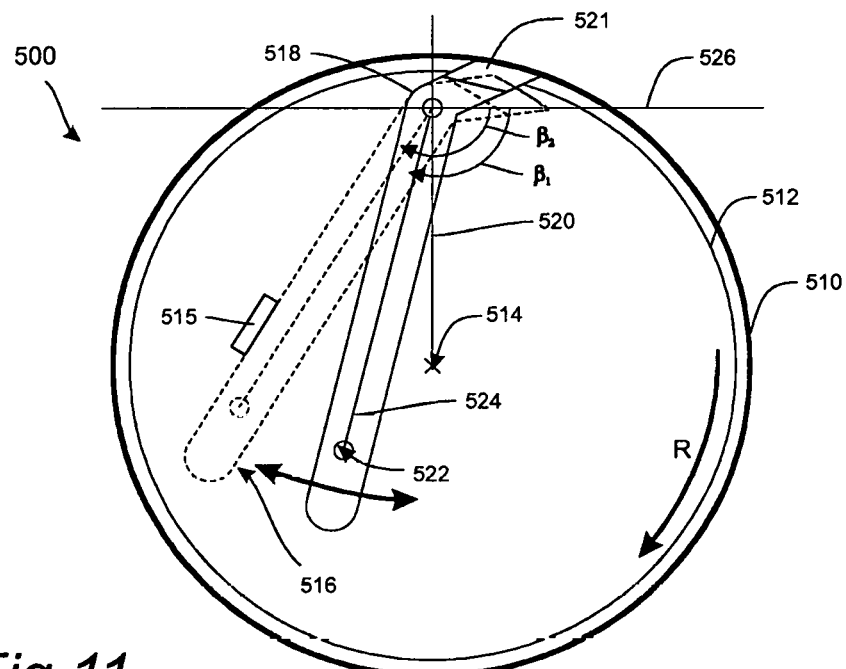
FIG. 11 is a schematic top view of a rotational friction brake 500 according to example embodiments of the present disclosure where braking action occurs during a positive angular acceleration when the second body rotates in the reference direction R.

Embodiments of the rotational friction brakes should not be limited to braking during the phase of negative angular acceleration. In FIG. 11 is shown a rotational friction brake 500 according to embodiments of the disclosure. For the rotational friction brake 500, braking is initiated during a phase of positive angular acceleration. The rotational friction brake 500 comprises a first body 510 and a second body 512 which is rotationally attached to the first body 510. The second body 512 is arranged to rotate around a rotational center axis 514 of the second body 512. The rotational friction brake 500 further comprises at least one braking arm 516 (in this example; one braking arm) which is rotationally attached to the second body 512 in a pivot point 518. The pivot point 518 is eccentrically offset to the rotational center axis 514 along a radial axis 520. The at least one braking arm 516 comprises a braking member 521 arranged to frictionally engage a part of the first body 510. Furthermore, the at least one braking arm 516 has a mass center 522 placed along a braking arm axis 524, which intersects the pivot point 518 and extends out, forming an angle ß to a normal axis 526 defined perpendicular to the radial axis 520 through the pivot point 518. The mass center 522 is placed at a distance from the pivot point 518 that is longer than a distance from the pivot point 518 to the rotational center axis 514. To achieve such a position of the mass center 522 with respect to the at least one braking arm 516, a portion of the at least one braking arm 516 is made out from a material with a density higher than the average density of the at least one braking arm 516. The portion may for example be made out of a metal. Rotational braking of the second body 512 occurs by frictional contact between the braking member 521 and the first body 510. The first body 510 may be for example a drum and the braking member 521 is then arranged to frictionally engage an inner portion of a peripheral wall of the drum. The braking member 521 is arranged to frictionally engage the part of the first body 510 for values of ß smaller than a first angle ß1. At least one stop member 515 (in this example; one stop member) is arranged to prevent ß to become larger than a second angle ß2, thus limiting movement of the at least one braking arm 516 relative to the second body.

The braking member 521 is elastic, or provides resilience, allowing the braking arm axis 524 to assume an angle ß smaller than the first angle ß1, which makes it possible to gradually increase the friction with a decrease of the angle ß for ß<ß1.

Figure 12:
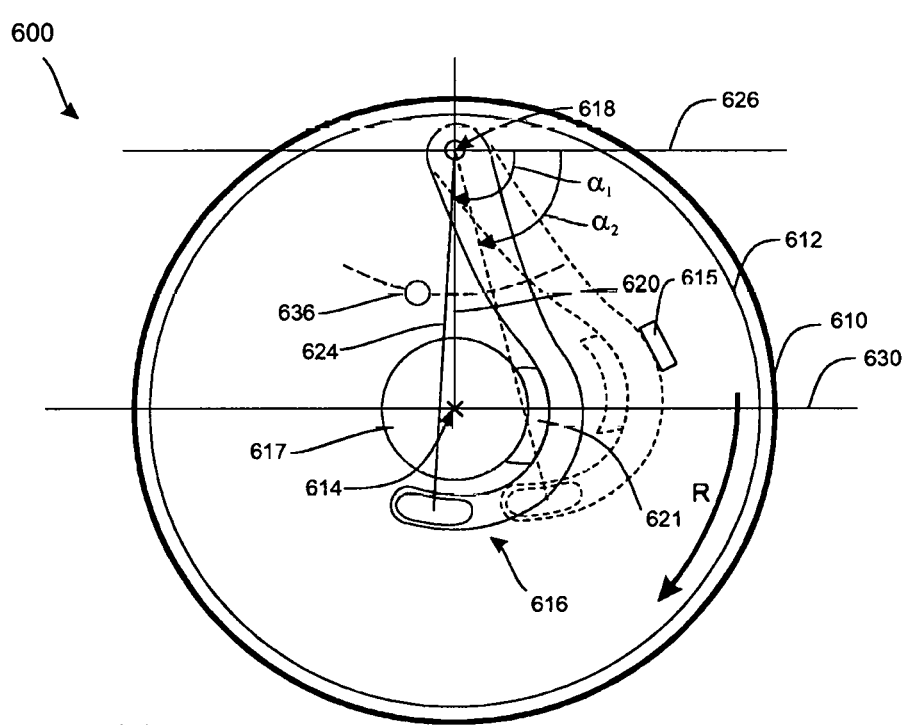
FIG. 12 is a schematic top view of a rotational friction brake 600 according to example embodiments of the present disclosure where the braking arm is arranged to frictionally engage an inner shaft of the first body.

It is to be understood that the angle ß used in FIG. 11 and the description hereinabove has the same function as the angle α used for other embodiments herein. Thus, the angle α and the angle ß may be used interchangeably. It may also be convenient to use the definition ß=180°−α dependent on the choice of reference direction. It is to be understood from the present disclosure that there are many embodiments possible within the scope of the claims. For example, the braking member may be arranged to frictionally engage the first body in other ways than disclosed in the embodiments in FIGS. 1,2,7-10. For example, the at least one braking arm may be arranged to frictionally engage a center shaft of the first body. Such a design is shown in FIG. 12, disclosing a rotational friction brake 600 according to embodiments of the present disclosure. The rotational friction brake 600 is similar to the rotational friction brake 100 shown in FIG. 2 except that the braking arm 616 is arranged to make contact with the first body via a center shaft 617 of the first body 610. The braking arm 616 comprises a braking member 621 arranged to frictionally engage the center shaft 617 of the second body 612. A stop member 615 is arranged at a position generally radially outwardly from the rotational center axis 614. The stop member 615 allows to limit the movement of the braking arm 616 such that the angle α is not lower than the second angle α2. The rotational friction brake 600 is actuated by a negative angular acceleration when the second body is rotated in the reference direction R.

Alternatively, the at least one braking arm may be arranged to frictionally engage a surface of the first body orthogonal to the rotational center axis. In this example, the braking member must be able to move towards the surface of the first body, for instance coaxially along an axis parallel with the rotational center axis, when the angle α varies. A mechanical solution to this is the use of a screw at the location of the pivot point. As the at least one braking arm moves radially outwards, increasing the angle α, the at least one braking arm simultaneously moves coaxially outwards towards the inner part of the first body. The braking member may then be mounted on the outside of the at least one braking arm on top of, or close to, the pivot point.

FIGS. 13a and b shows a rotational friction brake 700 based on this principle. In the rotational friction brake 700, the first body 710 and the second body 712 are disc-shaped and arranged parallel to each other such as to form a distance between them. The second body 712 is arranged to rotate in relation to the first body 710 around a rotational center axis 714. The rotational friction brake 700 comprises a braking arm 716 rotationally attached to the second body 712 in a pivot point 718. The braking arm 716 comprises a screw 719 arranged to connect to the first body 712 through a threaded hole. A braking member 721 is arranged at the distant end of the screw 719. In FIG. 7a, the rotational friction brake 700 is not active. The mass center of the braking arm 716 is located relatively close to the rotational center axis 714, the braking arm 716 being in contact with a stop member 715. As the second body 712 starts to decelerate, the braking arm will move such that its mass center moves outwardly as indicated by the curved arrow in FIG. 7a. As the angle α of the braking arm axis changes, the screw 719 will rotate in the treaded hole thus moving the braking member 721 in relation to the first body 710 along a pivot axis 718' such that the braking member 716 frictionally engages a portion (indicated by the dotted circle in FIGS. 7a and b) of the first body 710 as shown in FIG. 7b. Alternatively, the at least one braking arm may be arranged to frictionally engage an outer portion of a peripheral wall of the first body. A rotational friction brake based on this principle is shown in FIG. 14 showing a rotational friction brake 800. The first body 810 and the second body 812 is arranged in the same manner as for the rotational friction brake 700 shown in FIGS. 7a and b. The rotational friction brake 800 comprises a braking arm 816 rotationally attached to the second body 812 in a pivot point 818. The braking arm 816 extends in a direction generally radially outwardly along the radial axis 820 and forms a curved portion extending outside of an outer portion of a peripheral wall 811 of the first body 810. The braking arm 816 comprises a braking member at the end of the curved portion, the braking member being shaped such as to allow frictionally engaging the outer portion of the peripheral wall 811 of the first body.

Another important aspect is the movement of the at least one braking arm. It is to be understood from the present disclosure that the at least one braking arm does not necessarily move in a plane orthogonal to the rotational center axis of the second body. For example, the pivot point may be for example a hinge arranged for rotation of the at least one braking arm in a plane forming an angle other than 90° to the rotational center axis of the second body. For example, the braking member may be located at the other side of the at least one braking arm, i.e. at a position furthest away from the pivot point. As the angle α increases, the braking member will move radially outwards as well as coaxially outwards along the dimension parallel with the rotational center axis of the second body. At the angle α, the braking member will come in contact with an inner surface of the first body.

An advantage of any embodiment disclosed herein is that the rotational friction brake will be regulated by the angular acceleration of the rotating second body. This allows for the brake to be useful for applications where relatively high rotational speeds are required during a phase of positive angular acceleration, but braking is required during a phase of constant angular speed and/or a phase of negative angular acceleration. A typical example of applications where this may be useful is systems such as e.g. cable drums, water hoses, large paper rolls and sewing thread rolls. Another example is windlasses, for example anchor windlasses used for restraining and manipulating the anchor chain on a boat, allowing the anchor to be raised and lowered by means of a cable. These systems typically comprise a product (e.g. a cable, a hose, paper or thread) which in its nature is bendable and elongated, arranged to be winded onto a spool at a plurality of revolutions.

A further example of such an application is a fishing reel. FIG. 15 shows a fishing reel 50 comprising a housing 52 and a line spool 54 rotationally attached to the line spool 52. The line spool 54 is configured to house a fishing line 56 wound around the line spool 54 at a plurality of revolutions. The fishing reel further comprises a rewinding interface 58 arranged for allowing to rewind the fishing line 56 onto the line spool. The rewinding interface 58 is controlled by a handle 60. The fishing reel 50 further comprises the rotational friction brake 70. The rotational friction brake 70 is arranged to provide braking to the spool during casting of the line such as to prevent backlash. In the embodiment, the rotational friction brake 70 is a rotational friction brake according to the disclosure. Thus, it is understood that the rotational friction brake 70 may be any one from the embodiments disclosed herein. It is further to be understood that the rotational friction brake may be any embodiment of a rotational friction brake within the scope of the appended claims. An example of such a rotational friction brake is the rotational friction brake 400 shown in FIG. 10. Using this as an example, the first body 410 is part of, or fixedly attached to, the housing 52 of the fishing reel 50 and the second body 412 is part of, fixedly attached to or arranged to engage with the line spool 54.

This implies that, for some embodiments, the at least one braking arm may be rotationally attached directly to the line spool, i.e. that the line spool may be the second body. For alternative embodiments, the line spool may be a further body arranged to rotate with the second body. Such a further body may be fixedly attached to the second body for example via a connecting shaft, but may, alternatively, be arranged to engage with the second body by suitable engagement means, such as for example, gears, pins or the like. Such engagement means may be arranged to actively connect the further body to the second body. The engagement means may also be arranged to disconnect the further body from the second body. The further body and the second body may then be arranged to rotate individually from each other around the central axis of the second body.

To prevent the spool during casting, from rotating at such a high speed that the line cannot be paid out at the same rate but instead rises forming a so-called birds nest (also referred to as a backlash), the rotational friction brake 70 is arranged to brake the line spool 54 at the moment when it is needed. During a cast, the rotational speed of the line spool 54 increases rapidly to maximum speed during a relatively short, initial phase of positive angular acceleration to thereafter decrease during a longer phase of negative angular acceleration. During the phase of strong positive angular acceleration, the rotational friction brake 70 will not brake as the at least one braking arm will be forced, by the moment of inertia, towards the at least one stop member to the position where $\alpha=\alpha 2$. Somewhere around the moment of reaching the maximum angular speed, either being it at the end of the phase of positive angular acceleration, or at the beginning of the phase of negative angular acceleration, the at least one braking arm will start moving radially outwards increasing the angle $\alpha$. Braking will start at $\alpha=\alpha 1$ and continue during the phase of negative angular acceleration. To rewind the line 56, the spool 54 must be actively rotated in the counter direction. To prevent braking during this process, at least one preventing member is adjusted to prevent the at least one braking arm to reach angles $\alpha > \alpha 1$, i.e. preventing braking to occur. The at least one preventing member can preferably be connected to the rewinding interface 58 by which the user rewinds the line 56 onto the spool 54. Thus, the at least one preventing member will be in an inactivated position during the cast, allowing a being larger than $\alpha 1$, while being in an active position during the rewinding process, thus preventing a to reach $\alpha 1$.

The rotational friction brake disclosed herein is controlled by the rotational movement of the second body. Moreover, the braking action is different depending on the rotational direction of the second body. Thus, for practical applications it may be an advantage to provide a mean for manually disabling the brake altogether during particular operations. As previously disclosed, this may be achieved by the at least one preventing member. Here will be provided a detailed description of example embodiments disclosing how the at least one preventing member may relate to the at least one braking arm of the rotational friction brake.

FIGS. 16a and b shows a rotational friction brake 900 comprising two braking arms 916 arranged opposed to each other in the same fashion used in the rotational friction brake 400 shown in FIG. 10. The at least one braking arm 916 is arranged to frictionally engage the first body 910 on an inner peripheral wall of the first body 910. The rotational friction brake 900 further comprises a further body 913 arranged to rotate around the rotational center axis 914 of the second body 912. The second body 912 and the further body 913 are disc-shaped and located parallel to and at a distance from each other. The second body 912 comprises at least one elongated hole 937 arranged along a tangential direction of the second body 912 at a radial distance from the rotational center axis 914 longer than the radial distance between the rotational center axis 914 and the at least one pivot point 918. Each of the at least one elongated hole 937 is located such as to at least partially overlap each of the at least one braking arm 916. The further body 913 comprises at least one preventing member 936 (in the example: two preventing members) fixedly attached to the further body 913. The at least one preventing member 916 extends in a direction parallel to the rotational center axis 914 such that each of the at least one preventing member 936 protrudes through each of the at least one elongated hole 937. When rotating the further body 913 in relation to the second body 912, the at least one preventing member 936 may engage with the at least one braking arm such as to prevent the braking member 921 from frictionally engaging the first body 910. In other words, the at least one preventing member 936 is arranged to prevent the braking member 921 of each corresponding braking arm 916 from frictionally engaging the first body 910 when the further body 913 is rotated in relation to the second body 912 along a first rotational direction L.

An advantage with this design is that the first direction L is opposed to the operating rotational direction of the brake, i.e. the reference direction R. The rotational friction brake 900 is thus particularly well suited for applications involving elongated bendable objects on a spool. The advantage is described here using the fishing reel as an example.

In an embodiment of a fishing reel, the further body 913 is part of, or fixedly attached to a line spool, whereas the second body 912, comprising the one or more braking arms, is arranged to engage with the further body 913 by the one or more preventing members 936 protruding through the one or more elongated holes 937. During casting, when the further body 913 is forced, by the line, to rotate in the reference direction R, the second body 912 will, by means of the at least one preventing member 936 protrude through the at least one elongated hole 937, and thus be forced to rotate together with the further body 913. To avoid the at least one preventing member 937 to influence the at least one braking arm 916 unintentionally, the further body 913 may be arranged to lock to the second body 912 for example using a clasp, magnet or the like. When rewinding the spool such as to retrieve the line, the second body 912 is to be rotated in the direction opposed to the reference direction R and it is thus desirable to deactivate the rotational friction brake 900 as the positive angular acceleration inflicted upon the second body during rewinding may activate the brake, thus making the rewinding process difficult. By connecting the second body 912 to a rewinding interface, such as a mechanical interface equipped with a drive mechanism (e.g. a rotational handle or a motor), a user of the fishing reel will be allowed to actively force the second body 912 to rotate along the first rotational direction L by rotating the handle to rewind the spool hence retrieving the line onto the spool. As the second body 912 is forced to rotate along the first rotational direction L, the further body 913, comprising the line spool, will be forced to rotate with the second body 912. The at least one preventing member 916 will disable the braking action of the at least one braking arm 916 of the second body 912. As long as the user actively retrieves the line and the second body 912 hence actively forces the further body 913 to rotate in the first rotational direction L, the rotational friction brake will be disabled thus allowing for an efficient and easy rewinding procedure.

The rotational friction brake 900 shown in FIGS. 16a and b does not allow for disabling the braking without actively upholding the force exerted on the braking arms by the at least one preventing member. To overcome this problem, a locking mechanism may be used, the locking mechanism being adapted to secure the at least one braking arm in a position for which the braking member does not frictionally engage the further body. FIGS. 17a and b shows a rotational friction brake 1000 allowing for such a disabling of the brake:

FIG. 17a shows a rotational friction brake 1000 similar to the rotational friction brake 900 as far as the braking action is concerned. The rotational friction brake 1000 does however have an alternative way of disabling the rotational friction brake. For the rotational friction brake 1000, the further body 1013 has a central portion 1040 rotationally attached to the second body 1012. The further body further comprises at least one preventing member 1036 (in the example: two preventing members) fixedly attached to the central portion 1040. The at least one preventing member 1036 extends outwardly along a generally radial direction from the rotational center axis 1014. The at least one preventing member 1036 may be curved. Each one from the at least one braking arm 1016 comprises an anchor pin 1044 extending along a direction parallel with the rotational center axis 1014 and directed away from the second body 1012. When rotating the further body 1013 along a first direction L in relation to the second body 1012, each of the at least one preventing member 1036 will make contact with an anchor pin 1044 on a corresponding braking arm 1016, thus forcing the at least one braking arm 1016 to a position for which the braking member 1021 does not frictionally engage with the first body 1010.

The rotational friction brake 1000 further comprises a locking mechanism 1041a,1041b arranged to fix the at least one braking arm 1016 in relation to the second body 1012 when the braking member 1021 is not frictionally engaging the first body 1010. The locking mechanism 1041a,1041b comprises at least one first locking member 1041a arranged on the further body 1013 and at least one second locking member 1041b arranged on the at least one braking arm 1016. Each of the at least one first locking member 1041a is arranged to lock onto a corresponding each of the at least one second locking member 1041b, such that each of the at least one braking arm 1016 can be locked in relation to the further body 1013. For the rotational friction brake 1000, the at least one first locking member 1041a is at least one recess located along the peripheral edge of the central portion 1040 of the further body 1013. Similarly, the at least one second locking member 1041b is at least one protrusion on an edge of the at least one braking arm 1016. The locking mechanism 1041a,1041b is arranged such as to allow locking the at least one braking arm 1016 such that the at least one braking arm 1016 is not movable in relation to the second body 1012 in a position where the braking member 1021 does not frictionally engage the first body 1010. This position is shown in FIG. 17b.

The person skilled in the art realizes that the claimed rotational friction brake by no means is limited to the preferred embodiments described above. On the contrary, many modifications and variations are possible within the scope of the appended claims.

For example, braking arms of different design may be used on the same rotational friction brake. The braking arms may be arranged to frictionally engage the first body in different ways. The braking arms may be arranged to activate at different threshold levels of the acceleration of the second body.

Additionally, variations to the disclosed embodiments can be understood and effected by the skilled person in practicing the claimed invention, from a study of the drawings, the disclosure, and the appended claims.

The invention claimed is:

1. A rotational friction brake actuated and regulated by the rate of change of the angular speed, comprising:
    a first body,
    a second body rotationally attached to said first body, said second body being arranged to rotate around a rotational center axis of said second body,
    at least one braking arm rotationally attached to said second body in a pivot point wherein
    said pivot point is eccentrically offset to said rotational center axis along a radial axis,
    said at least one braking arm comprises a braking member arranged to frictionally engage a part of said first body,
    said at least one braking arm having a mass center placed along a braking arm axis,
        said braking arm axis
            intersecting said pivot point,
            forming an angle $\alpha$ to a normal axis, said normal axis being defined perpendicular to said radial axis through said pivot point,
        wherein said mass center is placed at a distance from said pivot point that is longer than
            a distance from said pivot point to said rotational center axis, wherein
    said braking member is arranged to frictionally engage said part of said first body for values of $\alpha$ larger than a first angle $\alpha_1$, and
    at least one stop member, wherein each of the at least one stop member is arranged to limit the movement of each of the at least one braking arm such that the angle $\alpha$ is limited to a minimum angle larger than a second angle $\alpha_2$, at which angle each of the at least one braking arm is in a non-braking position, thus limiting movement of said at least one braking arm relative to said second body,
    wherein said first angle $\alpha_1$ is larger than said second angle $\alpha_2$,
    wherein said second angle $\alpha_2$ is within the range $80°<\alpha_2<100°$, such that the at least one braking arm reacts on said rate of change of the angular speed, thereby moving in relation to said second body to actuate the rotational friction brake.

2. The rotational friction brake according to claim 1, wherein said braking member is elastic, or provides resilience, allowing said angle $\alpha$ of said braking arm axis to be larger than said first angle $\alpha_1$.

3. The rotational friction brake according to claim 1, wherein said first body is a drum and said braking member is arranged to frictionally engage an inner portion of a peripheral wall of said drum.

4. The rotational friction brake according to claim 3, wherein the shape of a part of said braking member is such that a distance between the pivot point and an outer periphery of the braking member increases with an increase in an angle $\gamma$, said distance being defined along a distance axis taking the angle $\gamma$ with respect to the radial axis,
    wherein said shape of said part of said braking member allows for a gradual increase of an area of contact between said braking member and said part of said first body when said braking member is being compressed.

5. The rotational friction brake according to claim 1, wherein said mass center of said at least one braking arm is located on one side of a plane, said plane
    being orthogonal to said radial axis,
    intersecting said rotational center axis, wherein said mass center of said at least one braking arm is located on the side of said plane not containing said pivot point.

6. The rotational friction brake according to claim 1, wherein said mass center of said at least one braking arm is located within a cylindrical volume, said cylindrical volume
- being coaxial with said rotational center axis,
- having a circular cross sectional area orthogonal to said rotational center axis,
- having a radius of said circular cross sectional area being equal to the distance between said rotational center axis and said pivot point.

7. The rotational friction brake according to claim 1, wherein said at least one braking arm comprises a portion made of a material with higher density than the average density of said braking arm, allowing for said mass center of said at least one braking arm to be positioned within, or close to, said portion.

8. The rotational friction brake according to claim 7, wherein the position of said portion with respect to the at least one braking arm is adjustable, allowing changing the position of said mass center with respect to said at least one braking arm.

9. The rotational friction brake according to claim 1, wherein said second body comprises two braking arms, wherein a first of said two braking arms is rotationally attached to said second body in said pivot point and wherein a second of said two braking arms is rotationally attached to said second body in a second pivot point, wherein said pivot point and said second pivot point are located along said radial axis on either side of said rotational center axis and with the same distance between said pivot point to said rotational center axis as between said second pivot point and said rotational center axis.

10. The rotational friction brake according to claim 1, wherein the position of the at least one stop member is adjustable, allowing for said second angle $\alpha_2$ to be varied.

11. The rotational friction brake according to claim 1, further comprising at least one preventing member arranged to be adjustable, allowing for the angle $\alpha$ to be limited to a maximum angle smaller than said angle $\alpha_1$, such that each of said at least one preventing member prevents said braking member of each corresponding braking arm from frictionally engaging said first body.

12. The rotational friction brake according to claim 11, further comprising:
- a further body, said further body being arranged to rotate around the rotational center axis of said second body,
- wherein said at least one preventing member is fixedly attached to said further body,
- wherein each of said at least one preventing member is arranged to prevent said braking member of each corresponding braking arm from frictionally engaging said first body when said further body is rotated in relation to said second body along a first rotational direction (L).

13. The rotational friction brake according to claim 12, further comprising a locking mechanism arranged to fix said at least one braking arm in relation to said second body when said braking member is not frictionally engaging said first body.

14. The rotational friction brake according to claim 13, wherein said locking mechanism comprises at least one first locking member arranged on said further body and at least one second locking member arranged on said at least one braking arm, wherein each of said at least one first locking member is arranged to lock onto a corresponding each of said at least one second locking member, such that each of said at least one braking arm can be locked in relation to said further body.

15. The rotational friction brake according to claim 1, wherein the second body is part of, fixedly attached to or arranged to engage with a spool arranged to contain an elongated bendable object, wherein said elongated bendable object is wound around said spool at a plurality of revolutions.

16. A fishing reel comprising the rotational friction brake according to claim 1, wherein the first body is part of, or fixedly attached to, a housing of the fishing reel and the second body is part of, fixedly attached to or arranged to engage with a line spool.

* * * * *